United States Patent
Oberhaus et al.

(10) Patent No.: US 6,983,308 B1
(45) Date of Patent: Jan. 3, 2006

(54) MAIL SYNCHRONIZATION OF REMOTE AND LOCAL MAIL SYSTEMS

(75) Inventors: Jared M. Oberhaus, Sunnyvale, CA (US); Andrew L. Laursen, San Mateo, CA (US); Paul A. Smethers, Cupertino, CA (US); Russell S. Greer, Los Gatos, CA (US)

(73) Assignee: Openwave Systems, Inc., Redwood City, CA (US)

( * ) Notice: Subject to any disclaimer, the term of this patent is extended or adjusted under 35 U.S.C. 154(b) by 589 days.

(21) Appl. No.: 09/219,072

(22) Filed: Dec. 22, 1998

Related U.S. Application Data

(60) Provisional application No. 60/109,088, filed on Nov. 19, 1998.

(51) Int. Cl.
G06F 15/16 (2006.01)

(52) U.S. Cl. .................. 709/206; 709/248; 709/217
(58) Field of Classification Search ............... 709/206, 709/217, 106, 203, 227–229, 248; 707/10, 707/201

See application file for complete search history.

(56) References Cited

U.S. PATENT DOCUMENTS

| | | | | |
|---|---|---|---|---|
| 5,483,352 A | | 1/1996 | Fukuyama et al. | |
| 5,625,818 A | | 4/1997 | Zarmer et al. | |
| 5,710,922 A | * | 1/1998 | Alley et al. | 707/201 |
| 5,742,763 A | | 4/1998 | Jones | |
| 5,757,669 A | * | 5/1998 | Christie et al. | 709/205 |
| 5,758,354 A | | 5/1998 | Huang et al. | |
| 5,802,510 A | | 9/1998 | Jones | |
| 5,826,039 A | | 10/1998 | Jones | |
| 5,832,489 A | * | 11/1998 | Kucala | 707/10 |
| 5,961,590 A | * | 10/1999 | Mendez et al. | 709/206 |
| 5,966,714 A | * | 10/1999 | Huang et al. | 707/201 |
| 6,018,762 A | * | 1/2000 | Brunson et al. | 709/206 |
| 6,052,735 A | * | 4/2000 | Ulrich et al. | 709/236 |
| 6,131,096 A | * | 10/2000 | Ng et al. | 707/10 |
| 6,304,881 B1 | * | 10/2001 | Halim et al. | 707/201 |
| 6,401,112 B1 | * | 6/2002 | Boyer et al. | 709/206 |
| 6,442,570 B1 | * | 8/2002 | Wu | 707/201 |

OTHER PUBLICATIONS

Hild et al., Mobilizing Applications, IEEE Personal Communications, Oct. 1997, pp. 26–34.

* cited by examiner

*Primary Examiner*—Hosain Alam
*Assistant Examiner*—Philip B. Tran
(74) *Attorney, Agent, or Firm*—Beyer Weaver & Thomas, LLP

(57) ABSTRACT

Improved techniques for synchronizing different electronic mail mailboxes (accounts) of a user are disclosed. The user is able to effectively see and interact with only a single "virtual" mailbox, which is the synchronized combination of the two different electronic mailboxes. The electronic mailboxes are used to receive, store, read and send electronic mail over a network to electronic mailboxes associated with recipients. The electronic mail can include electronic messages that contain text, graphics or video. The synchronization of the two different electronic mailboxes can be performed automatically in a two-way manner without user interaction. The synchronization can also be performed securely even though electronic messages are transmitted over a public network.

21 Claims, 21 Drawing Sheets

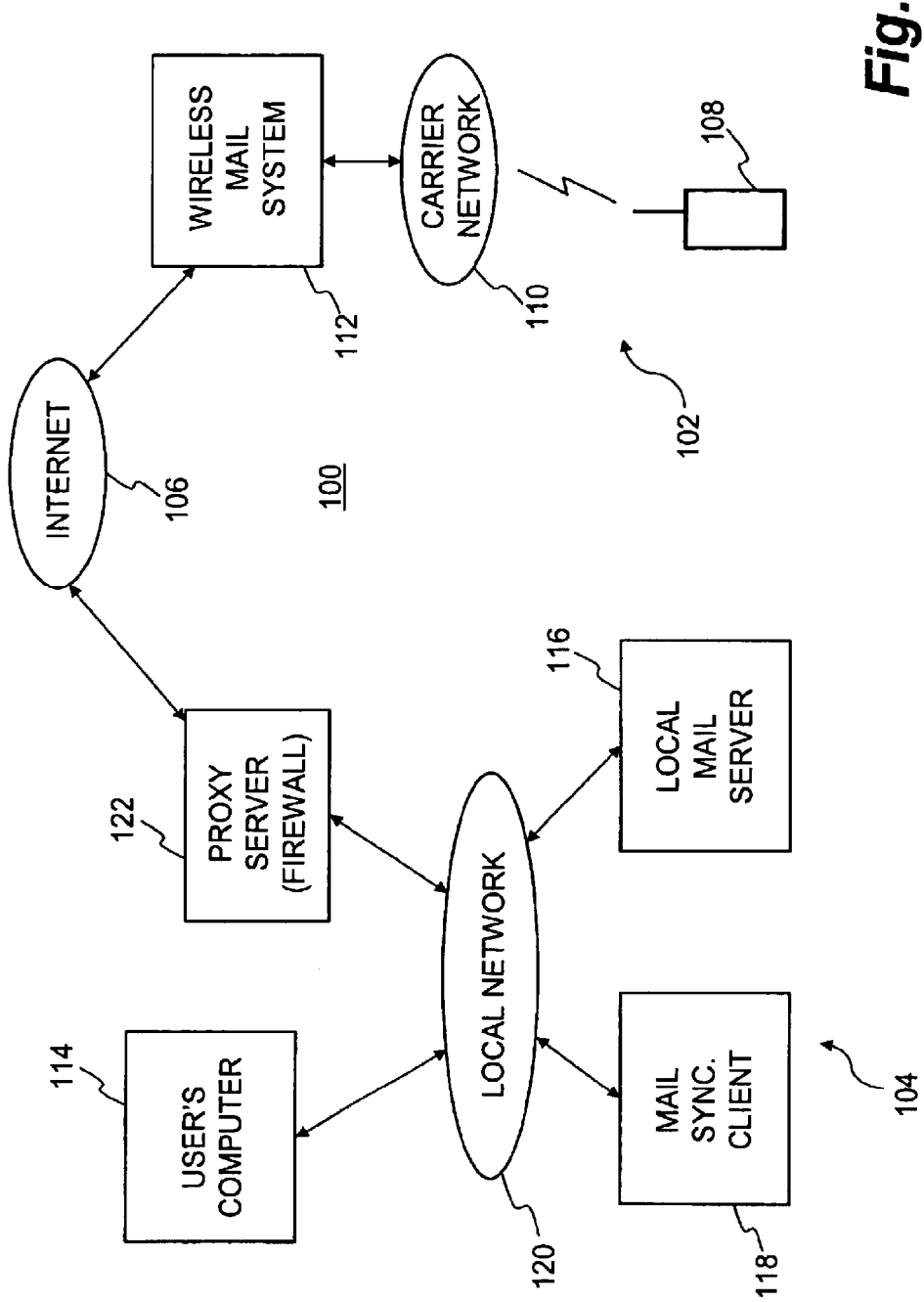

MAIL SYNCHRONIZATION OF REMOTE AND LOCAL MAIL SYSTEMS

CROSS REFERENCE TO RELATED APPLICATION

This application claims the benefit of U.S. Provisional Application No. 60/109,088, filed Nov. 19, 1998, and entitled "MAIL SYNCHRONIZATION OF REMOTE AND LOCAL MAIL SYSTEMS", the content of which is hereby incorporated by reference.

BACKGROUND OF THE INVENTION

1. Field of the Invention

The present invention relates to electronic mail systems and, more particularly, to synchronization of electronic mail systems.

2. Description of the Related Art

Today, various types of hand-held computing devices are commonly used. Examples of hand-held computing devices include pagers, mobile phones, personal digital assistants (PDAs), palm-top computers and electronic schedulers.

One popular hand-held computing device is PalmPilot produced by 3COM Corporation. The PalmPilot provides calendaring functions. A synchronization operation is requested by a user after the user physically connects the PalmPilot to the desktop computer over a dedicated cord or wire (e.g., typically using a cradle device). The synchronization operation allows (i) dates previously entered by a user into the PalmPilot to be synchronized with a calendaring program operating on a desktop computer and (ii) dates previously entered by the user of the desktop computer to be synchronized with the PalmPilot.

Some hand-held computing devices are able to send and receive electronic mail. The users of these devices typically have a desktop computer that connects to a network and enables the user to read, compose and send electronic mail. As such, these users have two mailboxes for receiving electronic mail, one for the hand-held computing device and another for the desktop computer. Conventionally, with respect to electronic mail, a user with multiple mailboxes for receiving electronic mail is able to forward electronic mail received in one mailbox to another mailbox (one-way forwarding). In addition, some hand-held computer devices (e.g., PalmPilot) are able to synchronize electronic mail when manually requested by a user. These systems providing for synchronization of electronic mail also do so over dedicated wires between the hand-held computer devices and the desktop computer.

Thus, there is a need for improved techniques for synchronizing different electronic mail accounts of a user.

SUMMARY OF THE INVENTION

Broadly speaking, the invention relates to improved techniques for synchronizing different electronic mail mailboxes (accounts) of a user. The user thus effectively sees and interacts with only a single "virtual" mailbox, which is the synchronized combination of the two different electronic mailboxes.

The electronic mailboxes are used to receive, store, read and send electronic mail over a network to electronic mailboxes associated with recipients. Electronic mail includes electronic messages that contain text, graphics, audio, video or other digitally encoded data. The synchronization of the two different electronic mailboxes includes, for example, insertion of new messages that arrive on one mailbox into the other mailbox, deletion of existing messages from the other mailbox if done on one mailbox, restoration of deleted messages on the other mailbox if restored on one mailbox, and marking of read/unread status in the other mailbox as done on one mailbox. The synchronization could also include delivery of a message from one mailbox to the other mailbox where the message is automatically sent.

The invention can be implemented in numerous ways, including as a method, an apparatus, a computer readable medium, and a computer system. Several embodiments of the invention are discussed below.

As a method for automatically synchronizing messages between first and second electronic mail systems that communicate over a network, one embodiment of the invention includes the acts of: automatically initiating synchronization of message lists associated with the first and second electronic mail systems; providing a connection between the first and second electronic mail systems through the network after the synchronization is initiated; and transmitting message information from the second electronic mail system to the first electronic mail system via the connection. Optionally, the connection is a secure connection, and the second electronic mail system provides mail services to mobile devices in a wireless manner.

As a method for synchronization of a second mail system and a first mail system, where the second mail system communicates with the first mail system through a public network, one embodiment of the invention includes the acts of: maintaining a first inbox for the first mail system, the first inbox having a first message list associated therewith; establishing a secure connection between the first mail system and the second mail system through the public network; requesting a second message list from the second mail system over the secure connection, the second message list being associated with a second inbox for the second mail system; comparing the first message list with the second message list to identify missing messages, the missing messages are those messages that are identified as being present in the second inbox but not also present in the first inbox; requesting the missing messages from the second mail system over the secure connection; receiving the missing messages from the second mail system over the secure connection through the public network; and inserting the missing messages that have been received into the first inbox of the first mail system.

As a method for synchronizing a first inbox of a first electronic mail application with a second inbox of a second electronic mail application, where the first electronic mail application and the second electronic mail application are connected through a public network, one embodiment of the invention includes the acts of: obtaining an action entry from an action list, the action list indicating changes that have occurred at the second inbox since last synchronization; preparing a synchronization action message based on the action entry; sending the synchronization action message to the first electronic mail application through the public network so that the first electronic mail application is able to perform the synchronization action of the synchronization message to render the first inbox more consistent with the second inbox; receiving an acknowledgement from the first electronic mail application that the synchronization action has been performed; and thereafter removing the action entry from the action list when the acknowledgement has been received.

As a method for initiating synchronization between first and second mailboxes, the first mailbox being associated with a first computing device coupled to a data network protected by a firewall, and the second mailbox being associated with a second computing device, one embodiment of the invention includes the acts of: receiving a request at the second computing device to initiate a synchronization session between the first and second mailboxes; generating a synchronization requesting electronic mail message; sending the synchronization requesting electronic mail message from the second mailbox to the first mailbox; and thereafter initiating synchronization between first and second mailboxes via the first computing device as requested by the synchronization requesting electronic mail message.

As a method for automatically sending an electronic mail message during a synchronization session between first and second mailboxes, the first mailbox being associated with a first computing device, and the second mailbox being associated with a second computing device, one embodiment of the invention includes: providing an electronic mail message on the second computing device that is to be sent to a destination address; storing the electronic mail message at the second computing device; delivering the electronic mail message to the first computing device during a synchronization session between the first and second mailboxes; and subsequently automatically sending the delivered electronic mail message to the destination address from the first computing device.

As a mail synchronization system, one embodiment of the invention includes: a remote mail system for providing electronic mail services to a mobile device, and a local mail system for providing electronic mail services to a desktop computer. The remote mail system includes a mobile device mail application, a mobile device mail server and a mail synchronization server. The mobile device mail server manages storage, receipt and delivery of electronic mail messages with respect to the mobile device. The mobile device is capable of displaying a list of electronic mail messages in a remote inbox. The list of the electronic mail messages for the remote inbox is stored in the mobile device mail server and made available to the mobile device by the mobile device mail application. The local mail system includes a local mail server and a mail synchronization client. The local mail server manages storage, receipt and delivery of electronic mail messages with respect to the desktop computer. The desktop computer is capable of displaying a list of electronic mail messages in a local inbox. The list of the electronic mail messages for the local inbox is stored in the local mail server and made available to the desktop computer. The mail synchronization client and the mail synchronization server interact to synchronize the list of the electronic mail messages for the local inbox and the list of the electronic mail messages for the remote inbox maintained by the local mail server and the remote mail server, respectively.

As a computer readable medium including computer program code for automatically synchronizing first and second electronic mail systems that communicate over a network, one embodiment of the invention includes: computer program code configured to automatically initiate synchronization of message lists associated with the first and second electronic mail systems; computer program code configured to provide a connection between the first and second electronic mail systems through the network after the synchronization is initiated; and computer program code configured to transmit message information from the second electronic mail system to the first electronic mail system via the connection.

The advantages of the invention are numerous. Different embodiments or implementations may yield one or more of the following advantages. One potential advantage of the invention is that a user is able to use two different electronic mail accounts (mailboxes) as if they are the same electronic mail account. Another potential advantage of the invention is that the two different electronic mail accounts are able to be automatically synchronized without user interaction. Still another potential advantage of the invention is synchronization between two different electronic mail accounts can be achieved through a public network. Yet another potential advantage of the invention is that an outgoing message can be automatically sent from the mailbox that receives the message in conjunction with synchronization.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 1 is a block diagram of a mail synchronization system according to an embodiment of the invention;

DETAILED DESCRIPTION OF THE INVENTION

Figure 2A:
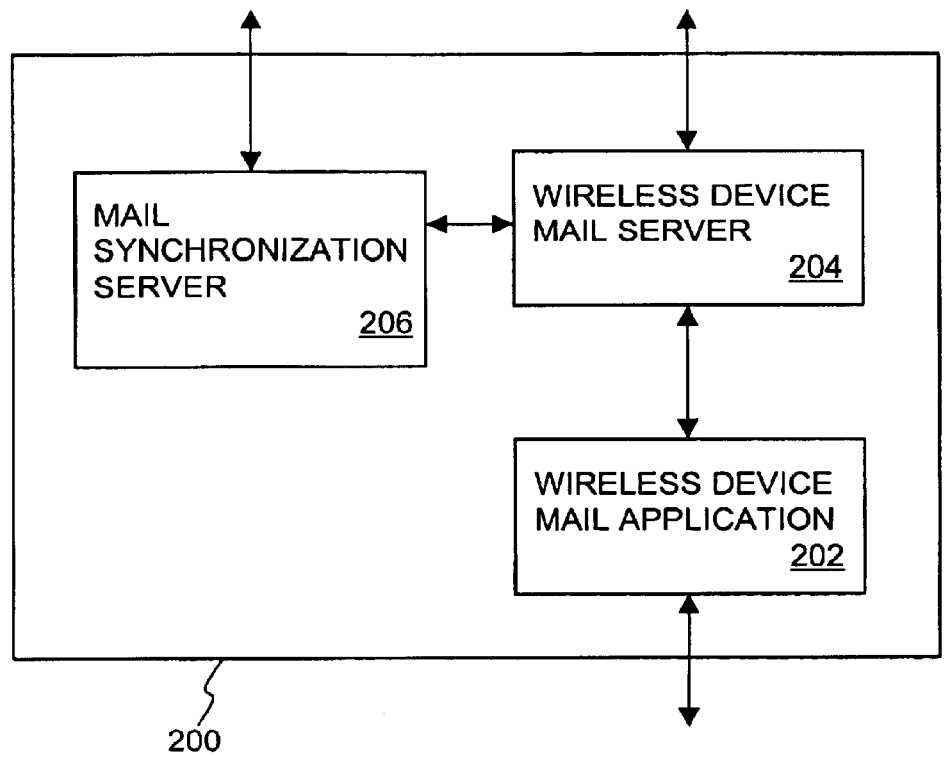
FIG. 2A is a block diagram of a wireless mail system according to one embodiment of the invention.

The invention relates to improved techniques for synchronizing different electronic mail mailboxes (accounts) of a user. The user thus effectively sees and interacts with only a single "virtual" mailbox, which is the synchronized (mirrored) combination of the two different electronic mailboxes.

The electronic mailboxes are used to receive, store, read and send electronic mail over a network to electronic mailboxes associated with recipients. Electronic mail includes electronic messages that contain text, graphics, audio, video or other digitally encoded data. The synchronization of the two different electronic mailboxes includes, for example, insertion of new messages that arrive on one mailbox into the other mailbox, deletion of existing messages from the other mailbox if done on one mailbox, restoration of deleted messages on the other mailbox if restored on one mailbox, and marking of read/unread status in the other mailbox as done on one mailbox. The synchronization could also include delivery of a message from one mailbox to the other mailbox where the message is automatically sent.

The electronic mail boxes are typically provided on computing devices for the benefit of users. The computing devices can be any of a wide variety devices with different sizes, performances and mobilities. The invention is particularly suitable for use with mobile devices that support electronic mail message operations. Examples of mobile devices (mobile computing devices or wireless devices) include pagers, mobile phones, personal digital assistants (PDAs), palm-top computers, electronic schedulers, and other information appliances. In such case, one mailbox is associated with a mobile device and the other mailbox is associated with a personal computer (e.g., a desktop computer). All messages are held in the computer's mailbox because it has greater storage capacity than the telephones mailbox. The telephone's mailbox represents a window of a fixed number of the topmost messages of the virtual mailbox.

Embodiments of this aspect the invention are discussed below with reference to FIGS. 1–12. However, those skilled in the art will readily appreciate that the detailed description given herein with respect to these figures is for explanatory purposes as the invention extends beyond these limited embodiments.

FIG. 1 is a block diagram of a mail synchronization system 100 according to an embodiment of the invention. The mail synchronization system 100 operates to synchronize a remote mail system 102 with a local mail system 104. The remote mail system 102 communicates with the local mail system 104 through the Internet 106. More generally, the Internet 106 can be any network but the invention is particularly well suited for use with public networks. Examples of networks include intranets and the Internet.

The remote mail system 102 includes mobile devices 108 that communicate through a carrier network 110 with a wireless mail system 112. The wireless mail system 112 connects to the Internet 106. In one embodiment, the wireless mail system 112 is provided with a gateway server or a proxy server that allows the mobile device 108 to communicate with the Internet 106. The wireless mail system provides electronic mail services to the mobile devices 108.

The local mail system 104 includes a user's computer 114, a local mail server 116, and a mail synchronization client 118. The user's computer 114 typically couples to the local mail server 116 and the mail synchronization client 118 through a local network 120. In one embodiment, the mail synchronization client 118 is provided within the user's computer 114. As an example, the local mail server 116 can be an Exchange-type server (e.g., Microsoft Exchange-type) or a SMTP-type server. The local network 120 is, for example, a local area network (LAN) or other type of small scale network. In one embodiment, the local network can be provided by an organization with the user being one user within the organization and with the mail server 116 providing mail services to the employees of the organization. In another embodiment, the local network 120 and a separate local mail server are not needed and the local mail server 116 and the mail synchronization client 118 are all provided on the user's computer 114. The local mail system 104 can also include a proxy server 122 (or firewall server) that couples the local network 120 to the Internet 106. The proxy server 122 can act as a firewall to protect the access to the local network 120 and any resources residing on the local network 120.

FIG. 2A is a block diagram of a wireless mail system 200 according to one embodiment of the invention. The wireless mail system 200 is, for example, suitable for use as the wireless mail system 112 illustrated in FIG. 1.

The wireless mail system 200 includes a wireless device mail application 202, a wireless device mail server 204 and a mail synchronization server 206. The wireless device mail application 202 provides mail processing for the mobile devices 108 of the remote mail system 102. In other words, the mobile devices 108 typically only provide a limited amount of processing capacity and, thus, much of the mail application processing is performed by the wireless device mail application 202 residing on a server computer located remotely with respect to the mobile devices 108. In this embodiment, the server computer is the server computer that supports the wireless mail system 200. Hence, the wireless device mail application 202 communicates with the mobile devices 108 through the carrier network 110. The wireless device mail application also communicates with the wireless device mail server 204.

The wireless device mail server 204 is provided in the wireless mail system 200 to manage the receipt and delivery of electronic mail with respect to users of the mobile devices 108. In this regard, the wireless device mail server 204 communicates to local mail servers through the Internet 106. The mail synchronization server 206 is provided in the wireless mail system 200 to manage the synchronization of the wireless device mail server 204 with the local mail server 116 of the local mail system 104. The mail synchronization server 206 also couples to the Internet 106.

Figure 2B:
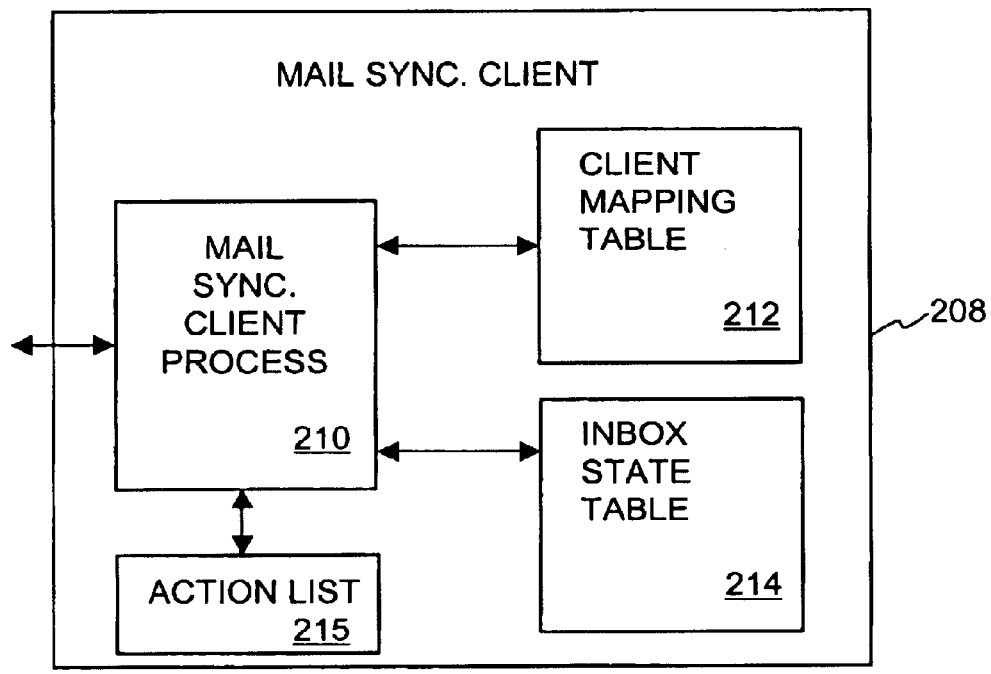
FIG. 2B is a block diagram of a mail synchronization client according to one embodiment of the invention.

FIG. 2B is a block diagram of a mail synchronization client 208 according to one embodiment of the invention. The mail synchronization client 208 is, for example, suitable for use as the mail synchronization client 118 illustrated in FIG. 1. The mail synchronization client 208 includes a mail synchronization client process 210 that provides operations associated with synchronizing the wireless device mail server 204 with the local mail server 116. To facilitate the synchronization operations performed by the mail synchronization client process 210, the mail synchronization client 208 also includes a client mapping table 212, an inbox state table 214, and an action list 215. The client mapping table 212 is used to associate electronic mail messages on mobile devices 108 with those on the user's computer 114. The inbox state table 214 is used to save the state of the inbox for the user's computer 114 at the time in which the last synchronization occurred between the remote mail system 102 and the local mail system 104. The action list 215 contains a list of actions (i.e., synchronization actions) that have occurred with respect to the local mail server 116 since that last time the wireless device mail server 206 was synchronized with the local mail server 116.

Figure 2C:
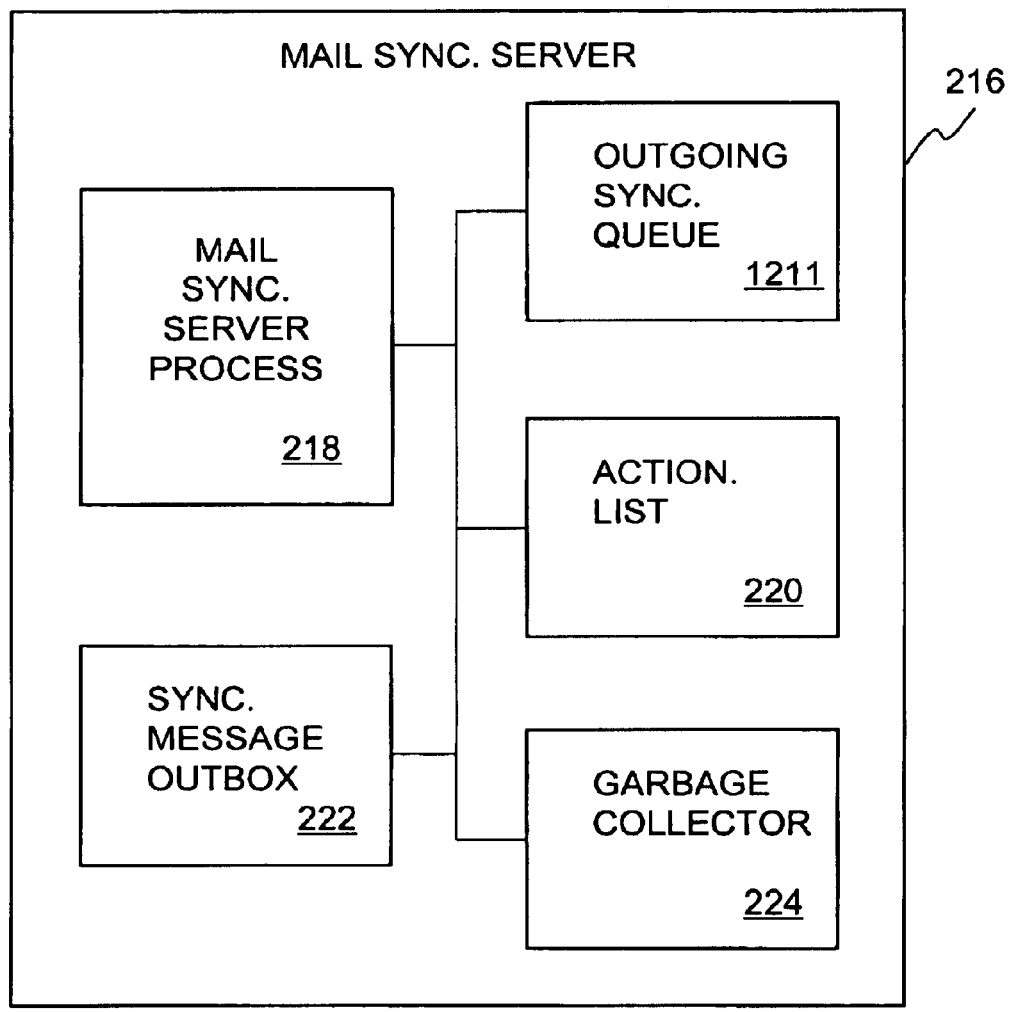
FIG. 2C is a block diagram of a mail synchronization server according to one embodiment of the invention.

FIG. 2C is a block diagram of a mail synchronization server 216 according to one embodiment of the invention. The mail synchronization server 216 is, for example, suitable for use as the mail synchronization server 206 illustrated in FIG. 2A. The mail synchronization server 216 includes a mail synchronization server process 218 that manages synchronization operations performed by the mail synchronization server 216. To assist the mail synchronization server process 218 in performing the synchronization operations, the mail synchronization server process 218 uses an action list 220, a synchronization message outbox 222, and a garbage collector 224. The action list 220 provides a list of synchronization actions that are to be sent to the mail synchronization client 208. The synchronization actions operate to track the changes or alterations that have taken place with respect to the wireless device mail server 204, namely, changes to the inbox for the mobile device 108 maintained by the wireless device mail application 202. The synchronization message outbox 222 is used to store messages that have been prepared by the mobile devices 108 for sending during the synchronization process. The garbage collector 226 operates to remove the oldest messages from resources of the wireless mail system 112 when the number of messages stored exceed the available resources for the mobile devices 108.

Figure 3A:
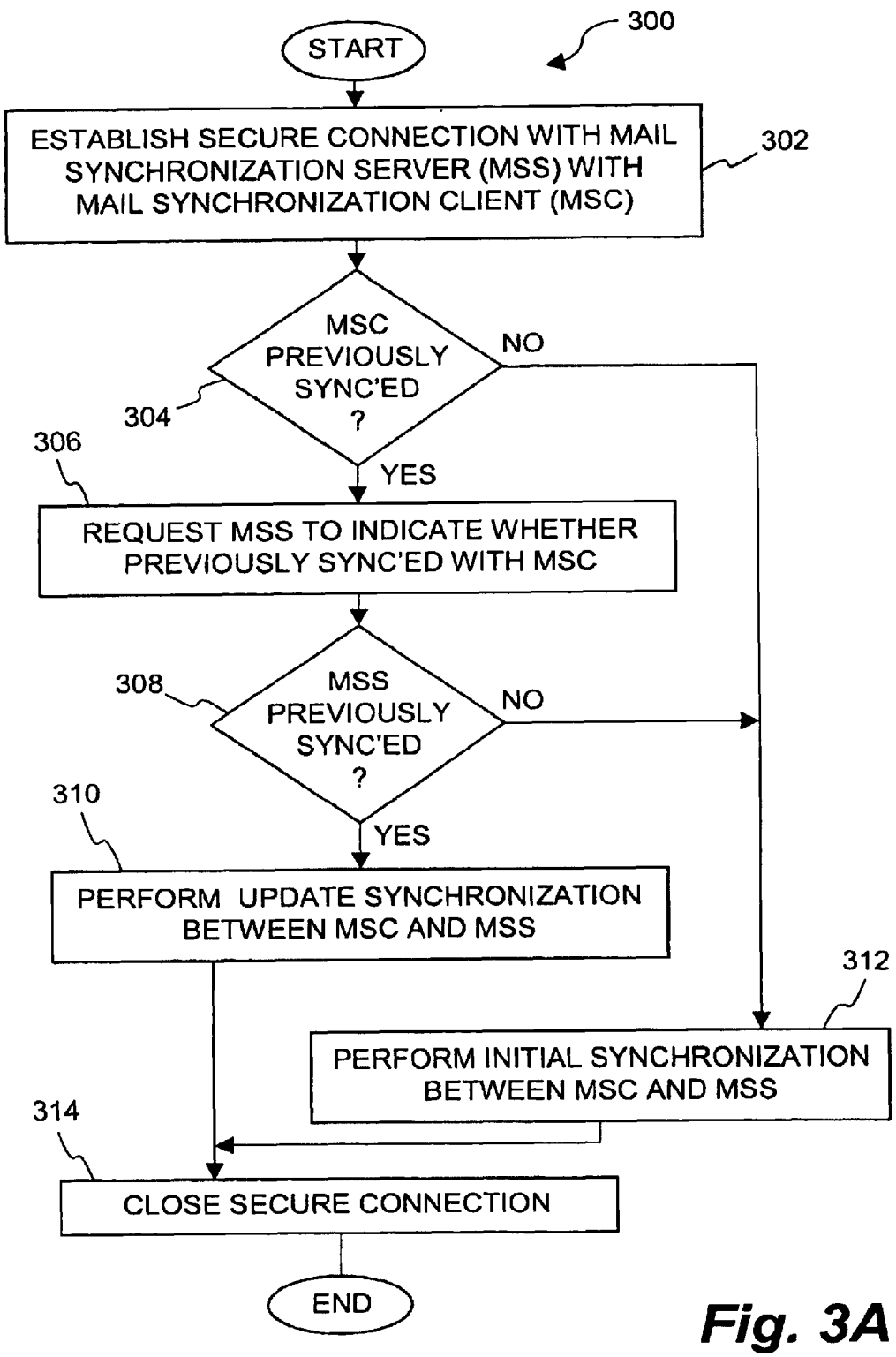
FIG. 3A is a flow diagram of synchronization processing according to one embodiment of the invention.

FIG. 3A is a flow diagram of synchronization processing 300 according to one embodiment of the invention. The synchronous processing 300 is, for example, performed by the mail synchronization client 118 and the mail synchronization server 206 illustrated in FIGS. 1 and 2A, respectively.

The synchronization processing 300 begins by establishing a secure connection with a mail synchronization server (MSS) and a mail synchronization client (MSC) at block 302. For example, the mail synchronization server can be the mail synchronization server 206 illustrated in FIG. 2A and the mail synchronization client can be the mail synchronization client 118 illustrated in FIG. 1. As an example, the secure connected can be established using secure socket layer (SSL) protocols or other well known encryption techniques. Additionally, the connection between the mail synchronization server and the mail synchronization client is a dedicated connection or path through the network. The network protocol used over the connection can vary but can, for example, include Hyper Text Transport Protocol (HTTP) or File Transport Protocol (FTP). When the connection is a secure connection, the network protocol can utilize secure HTTP (or HTTPs).

Next, at decision block 304, it is determined whether the mail synchronization client has been previously synchronized. When the mail synchronization client has been previously synchronized, then the synchronization processing 300 requests the mail synchronization server to indicate whether it has been previously synchronized with the mail synchronization client at block 306. Then, at decision block 308, a decision block determines whether the mail synchronization server was previously synchronized. When a decision block 308 determines that the mail synchronization server was previously synchronized then, in block 310, an update synchronization is performed between the mail synchronization client and the mail synchronization server. Thereafter, the secure connection between the mail synchronization client and the mail synchronization server is closed at block 314. Following block 314, the synchronization processing is complete and ends.

Alternatively, when the decision block 304 determines that the mail synchronization client was not previously synchronized, or the decision block 308 determines that the mail synchronization server was not previously synchronized, then initial synchronization is performed between the mail synchronization client and the mail synchronization server at block 312. Here, the initial synchronization is performed instead of the update synchronization because one or both have not been previously synchronized with one another. Following block 312, the synchronization processing 300 performs the block 314 and subsequent blocks.

Figure 3B:
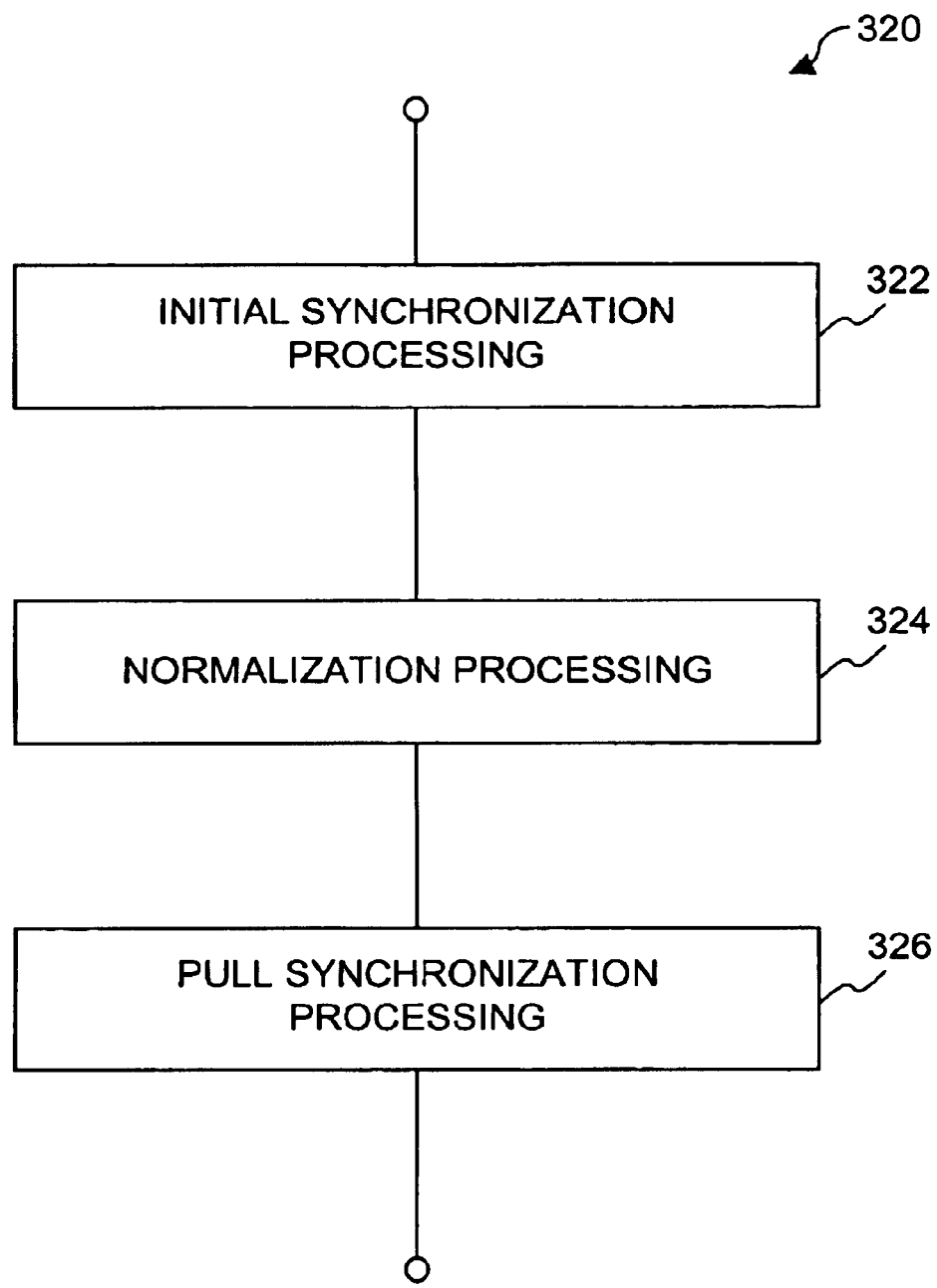
FIG. 3B is a flow diagram of initial synchronization according to one embodiment of the invention.

FIG. 3B is a flow diagram of initial synchronization 320 according to one embodiment of the invention. The initial synchronization 320 is, for example, processing associated with the block 312 of FIG. 3A. The initial synchronization 320 begins by performing initial synchronization processing at block 322. Then, at block 324, normalization processing is performed at block 324. After block 324, pull synchronization processing is performed at block 326. Following block 326, the initialization synchronization 320 is complete and ends.

Figure 3C:
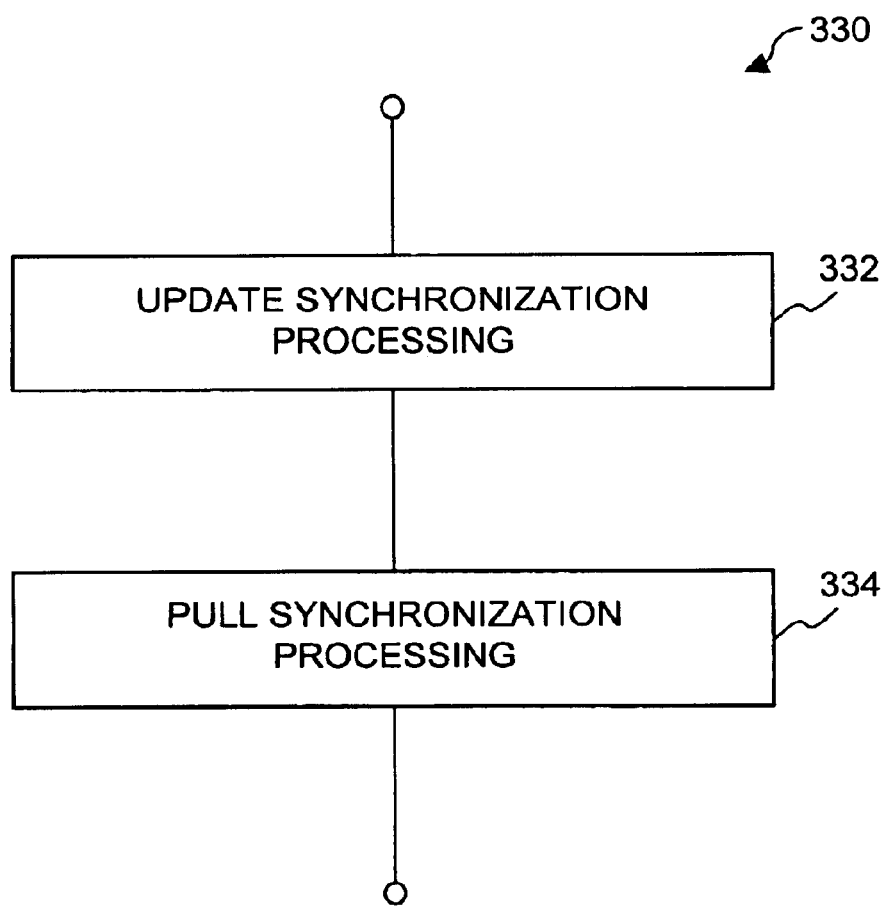
FIG. 3C is a flow diagram of update synchronization according to one embodiment of the invention.

FIG. 3C is a flow diagram of update synchronization 330 according to one embodiment of the invention. The update synchronization 330 is, for example, processing associated with the block 310 of FIG. 3A. The update synchronization 330 begins by performing update synchronization processing at block 332. Then, at block 334, pull synchronization is performed. Following block 334, the update synchronization 330 is complete and ends.

Figure 4:
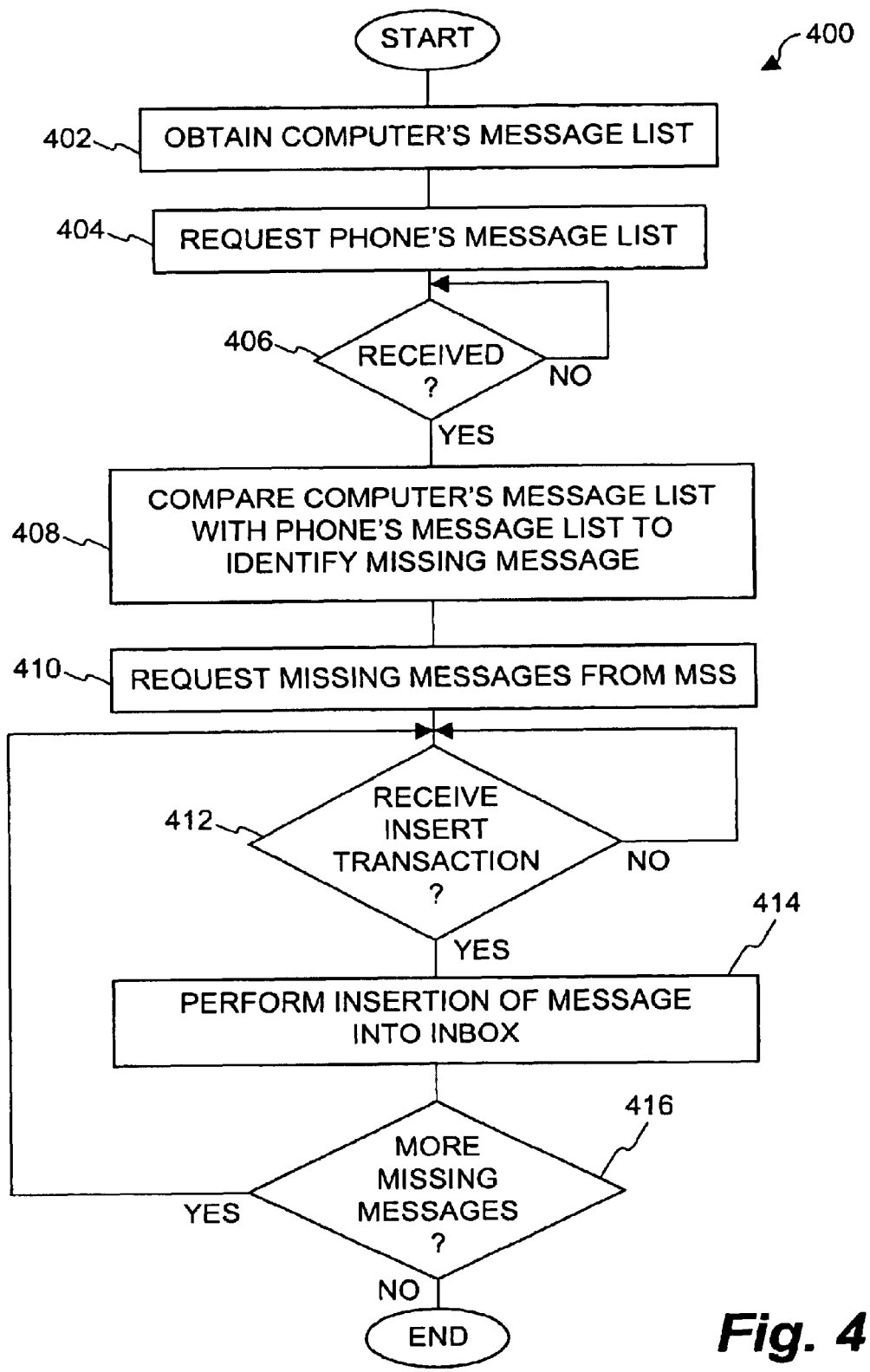
FIG. 4 is a flow diagram of client-side initial synchronization processing according to one embodiment of the invention.

FIG. 4 is a flow diagram of client-side initial synchronization processing 400 according to one embodiment of the invention. The client-side initial synchronization processing 400 is, for example, performed by the block 312 illustrated in FIG. 3A or the block 322 illustrated in FIG. 3B, so as to provide an initial synchronization between the mail synchronization client and the mail synchronization server.

The client-side initial synchronization processing 400 initially obtains a computer's message list in block 402. The computer's message list is the list of messages that appear in a mail inbox that is associated with the computer. Next, a request is made for the telephone's message list. The telephone's message list is the list of messages that appear in the mail inbox for the telephone. Following block 404, a decision block 406 determines whether the telephone's message list that has been requested has been received at the mail synchronization client. The decision block 406 causes the client-side initial synchronization processing 400 to await the reception of the telephone's message list. Once the telephone's message list has been received, the computer's message list is compared with the telephone's message list to identify missing messages in block 408.

The mail synchronization client then requests the missing messages from the mail synchronization server in block 410. Following block 410, a decision block 412 determines whether any insert transactions associated with any of the requested missing messages have been received from the mail synchronization server. The decision block 412 causes the client-side initial synchronization processing 400 to await the reception of such insert transactions. Once the decision block 412 determines that an insert transaction for one of the missing messages has been received, the insertion of the message into the inbox for the computer is performed at block 414. The message is identified on the server-side by a server identifier and on the client-side by a client identifier. Once the message is inserted into the inbox (block 414), the message is correlated (e.g., mapped) on the client-side such that the server identifier for the message is correlated (e.g., mapped) to the client identifier for the message.

Following block 414, a decision block 416 determines whether there are more missing messages to be processed. When the decision block 416 determines that there are more messages to be processed, the client-side initial synchronization processing 400 returns to repeat the decision block 412 and subsequent blocks. On the other hand, once the decision block 416 determines that there are no more missing messages to be processed, the client-side initial synchronization processing 400 is complete and returns.

Additionally, the client-side initial synchronization processing 400 could begin by deleting synchronization state information it might have for the telephone or mobile device. The client-side initial synchronization processing 400 could also issue a request to the mail synchronization server to delete its synchronization state information. This operates to reset all the synchronization state information when the initial synchronization first begins. The decision block 412 can also include a timeout condition so that the mail synchronization client does not get stuck waiting indefinitely for receipt of the insert transactions from the mail synchronization server. Given that a public network (e.g., the Internet) is used to provide communications between the mail synchronization client and the mail synchronization server, including such a timeout condition is useful.

Figure 5:
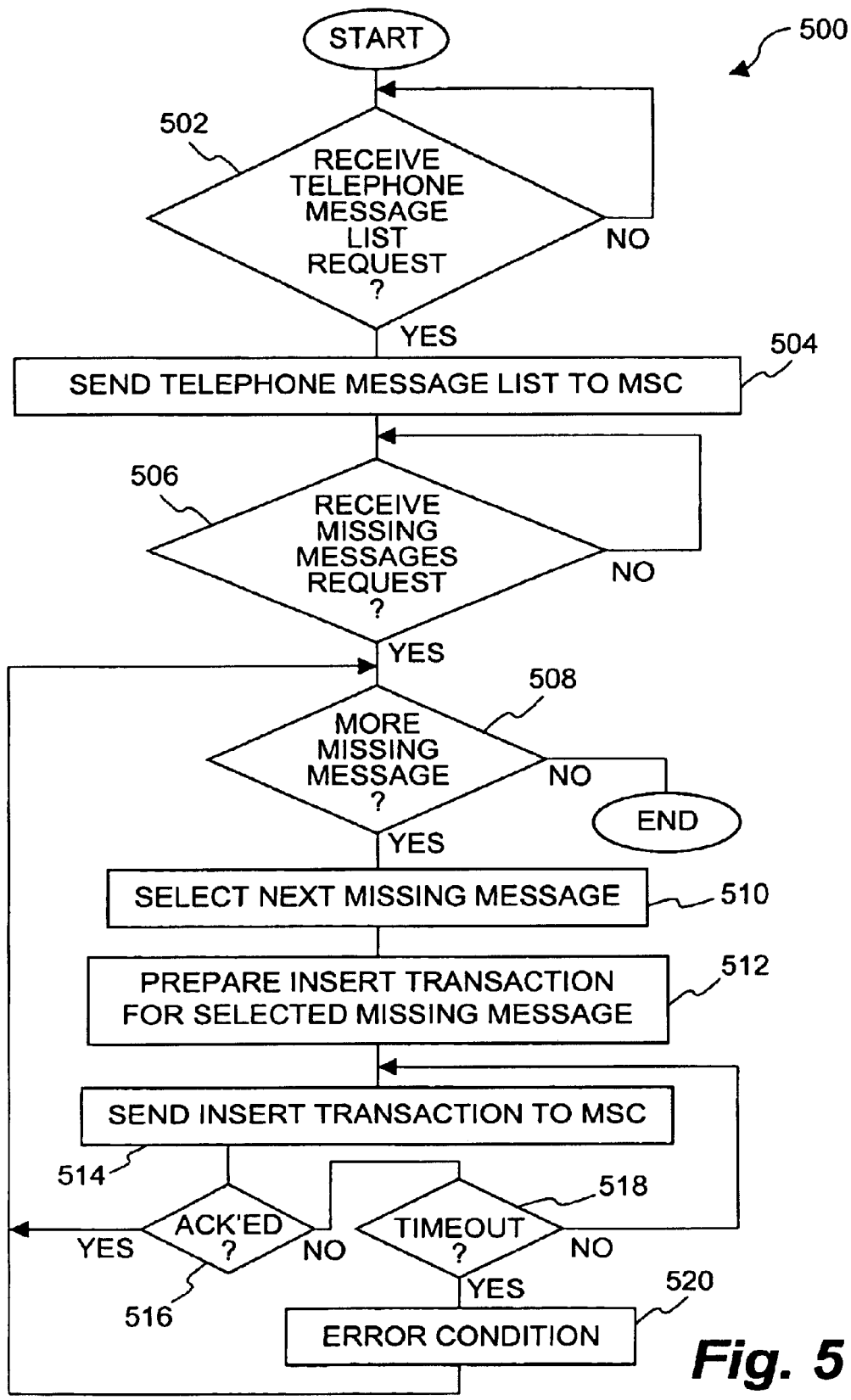
FIG. 5 is a flow diagram of server-side initial synchronization processing according to one embodiment of the invention.

FIG. 5 is a flow diagram of server-side initial synchronization processing 500 according to one embodiment of the invention. The server-side initial synchronization processing 500 is, for example, performed by the mail synchronization server 206 illustrated in FIG. 2A or the mail synchronization server 216 illustrated in FIG. 2C. More particularly, the server-side initial synchronization processing 500 is, for example, performed by the block 322 illustrated in FIG. 3B so as to provide an initial synchronization between the mail synchronization client and the mail synchronization server.

The server-side initial synchronization processing 500 begins with a decision block 502 that determines whether a telephone message list request has been received. Here, in effect, the server-side initial synchronization processing 500 is invoked when the mail synchronization server receives a request for a telephone message list from the mail synchronization client. Once the request for the telephone message list has been received, the telephone message list is sent to the mail synchronization client in block 504. If the telephone message list is not already available, then the telephone message list can be first produced and then sent to the mail synchronization client.

Following block 504, a decision block 506 determines whether a missing messages request has been received. Once a missing messages request has been received, a decision block 508 determines whether there are more missing messages to be processed. Initially, there will normally be one or more missing messages which are requested in the missing messages request. Hence, the one or more missing messages can then be processed in the order they appear in the missing messages request. In any case, when there are more messages to be processed, the next missing message is selected in block 510. Then, an insert transaction is prepared in block 512 for the selected missing message. Next, the insert transaction is sent to the mail synchronization client at block 514.

Following block 514, a decision block determines whether an acknowledgment has been received by the mail synchronization client. When the decision block 516 determines that an acknowledgment has not yet been received, a decision block 518 determines whether a time-out has occurred. If a time-out has not yet occurred, the server-side initial synchronization processing 500 can return to repeat the block 514 to re-send the insert transaction. On the other hand, when the decision block 518 determines that a time-out has occurred, then an error condition is noted at block 520. Following block 520, as well as following the decision block 516 when the receipt of the insert transaction that has been sent has been acknowledged, the server-side initial synchronization processing 500 returns to repeat the decision block 508 and subsequent blocks. In any event, once the decision block 508 determines that there are no more missing messages to be processed, the server-side initial synchronization processing 500 is complete and ends.

Following the initial synchronization such as shown in FIGS. 4 and 5, normalization processing and then pull synchronization are performed in order to synchronize those messages appearing on the telephone's inbox with those appearing in the computer's inbox. The normalization processing pertains to the block 324 illustrated in FIG. 3B, and the pull synchronization pertains to the block 326 illustrated in FIG. 3B and the block 334 illustrated in FIG. 3C. Since the inbox size of the telephone typically has a maximum size much smaller than that provided by the computer, the synchronization of the contents of the inboxes is only to the extent of the telephone's inbox.

Figure 6A:
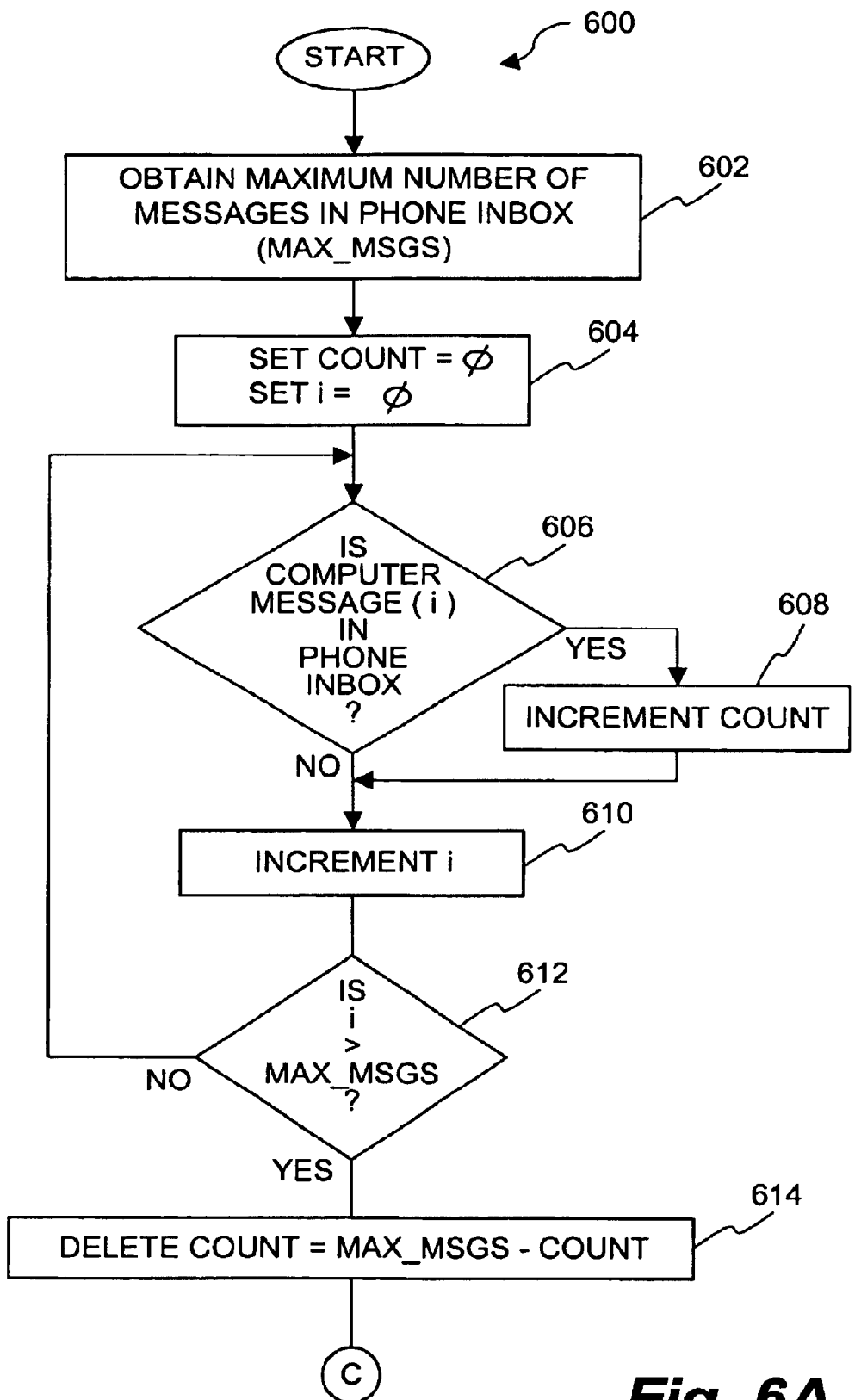
FIGS. 6A and 6B is a flow diagram of normalization processing for the mail synchronization client.
Figure 6B:
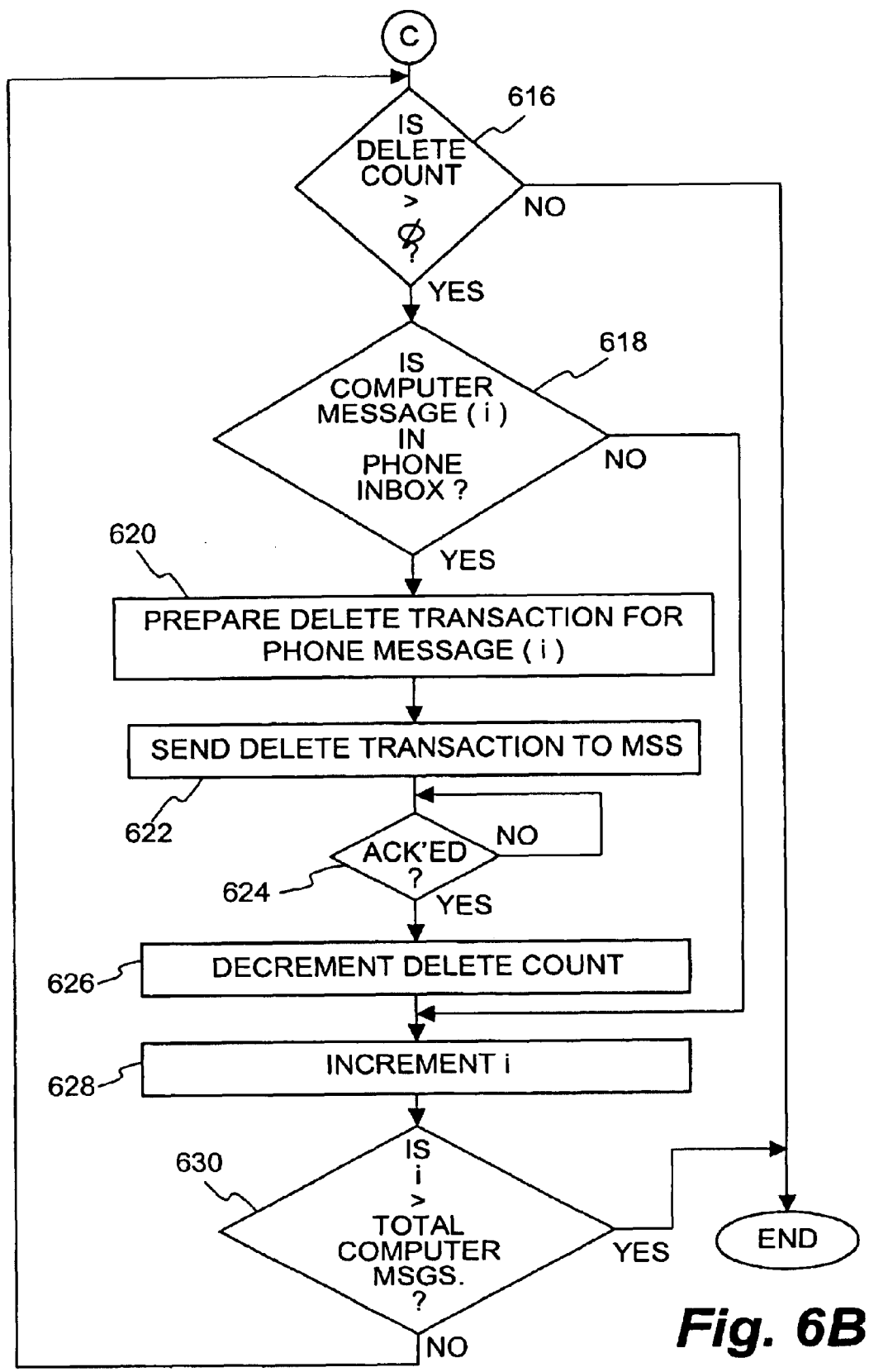

FIGS. 6A and 6B is a flow diagram of normalization processing 600 for the mail synchronization client. The normalization processing 600 is, for example, performed by block 324 illustrated in FIG. 3B.

The normalization processing 600 initially obtains a maximum number of messages in the telephone (phone) inbox (MAX_MSGS) at block 602. Typically, this maximum number was either previously obtained from the mail synchronization server or is requested at this time. Then, a count and an index (i) are set to zero (0) at block 604. Following block 604, a decision block 606 determines whether the computer message (i) of the computer's inbox is within the telephone's inbox. In one embodiment, the client mapping table 212 can be used to rapidly determine whether the computer message (i) of the computer's inbox is within the telephone's inbox (i.e., when there is mapping for the computer message (i) in the client mapping table 212). When the decision block 606 determines that the computer message (i) is within the telephone's inbox, then the count is incremented at block 608. On the other hand, when the decision block 606 determines that that computer message (i) is not within the telephone's inbox, then the block 608 is bypassed.

Following block 606, as well as following block 608, the index (i) is incremented at block 610. Then, a decision block 612 determines whether the index (i) is greater than the maximum number of messages in the telephone's inbox (MAX_MSGS) at block 612. When the index (i) is not greater than the maximum number of messages in the telephone's inbox, then the normalization processing 600 returns to repeat the decision block 606 and subsequent blocks so that additional computer messages can be checked for their presence in the telephone's inbox. Once the decision block 612 determines that the index (i) is greater than the maximum number of messages in the telephone's inbox, then a delete count is determined at block 614. The delete count can be determined by subtracting the count from the maximum number of messages in the telephone's inbox (MAX_MSGS).

Next, a decision block 616 determines whether the delete count is greater than zero (0). When the decision block 616 determines that the delete count is not greater than zero, then the normalization processing 600 is complete and ends. On the other hand, when the decision block 616 determines that the delete count is greater than zero, a decision block 618 determines whether the computer message (i) is within the telephone's inbox. Again, in one embodiment, the client mapping table 212 can be used to rapidly determine whether the computer message (i) of the computer's inbox is within the telephone's inbox.

When the decision block 618 determines that the computer message (i) is not in the telephone's inbox, then processing is performed to delete the associated message in the telephone's inbox. In particular, a delete transaction for the telephone message (i) is prepared at block 620. Here, the client identifier for the telephone message (i) to be deleted is correlated (e.g., mapped) to the associated server identifier for use by the mail synchronization server. The delete transaction is then sent at block 622 to the mail synchronization server. Preferably, the delete transaction is sent to the mail synchronization server using the previously established secure connection (FIG. 3A, block 302).

Following block 622, a decision block 624 causes the normalization processing 600 to await an acknowledgment from the mail synchronization server. Once the decision block 624 determines that an acknowledgment from the mail synchronization server has been received, the delete count is decremented at block 626 because a message has been deleted from the telephone's inbox. Next, the index (i) is incremented at block 628. Following block 628, a decision block 630 determines whether the index (i) is greater than the total number of computer messages. When the index (i) is not greater than the total number of computer messages, then the normalization processing 600 returns to repeat the decision block 616 and subsequent blocks. On the other hand, when the decision block 630 determines that the index (i) is greater than the total number of computer messages, the normalization processing 600 is complete and ends.

On the other hand, when the decision block 618 determines that the computer message (i) is already in the telephone's inbox, then blocks 620–626 are bypassed. In this case, the normalization processing 600 does not delete any message from the telephone's inbox.

Figure 7A:
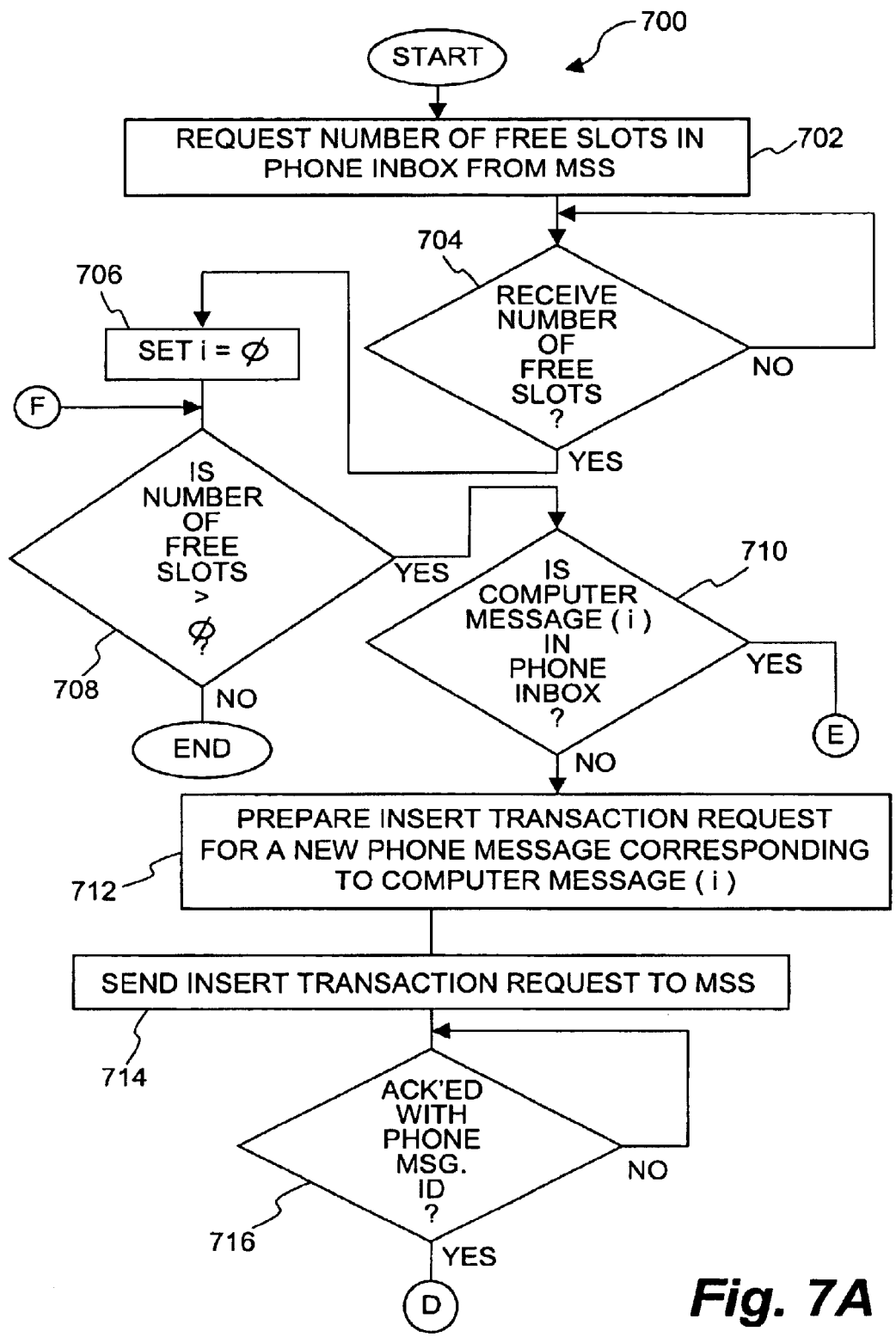
FIGS. 7A and 7B are flow diagrams of client-side pull synchronization according to one embodiment of the invention.
Figure 7B:
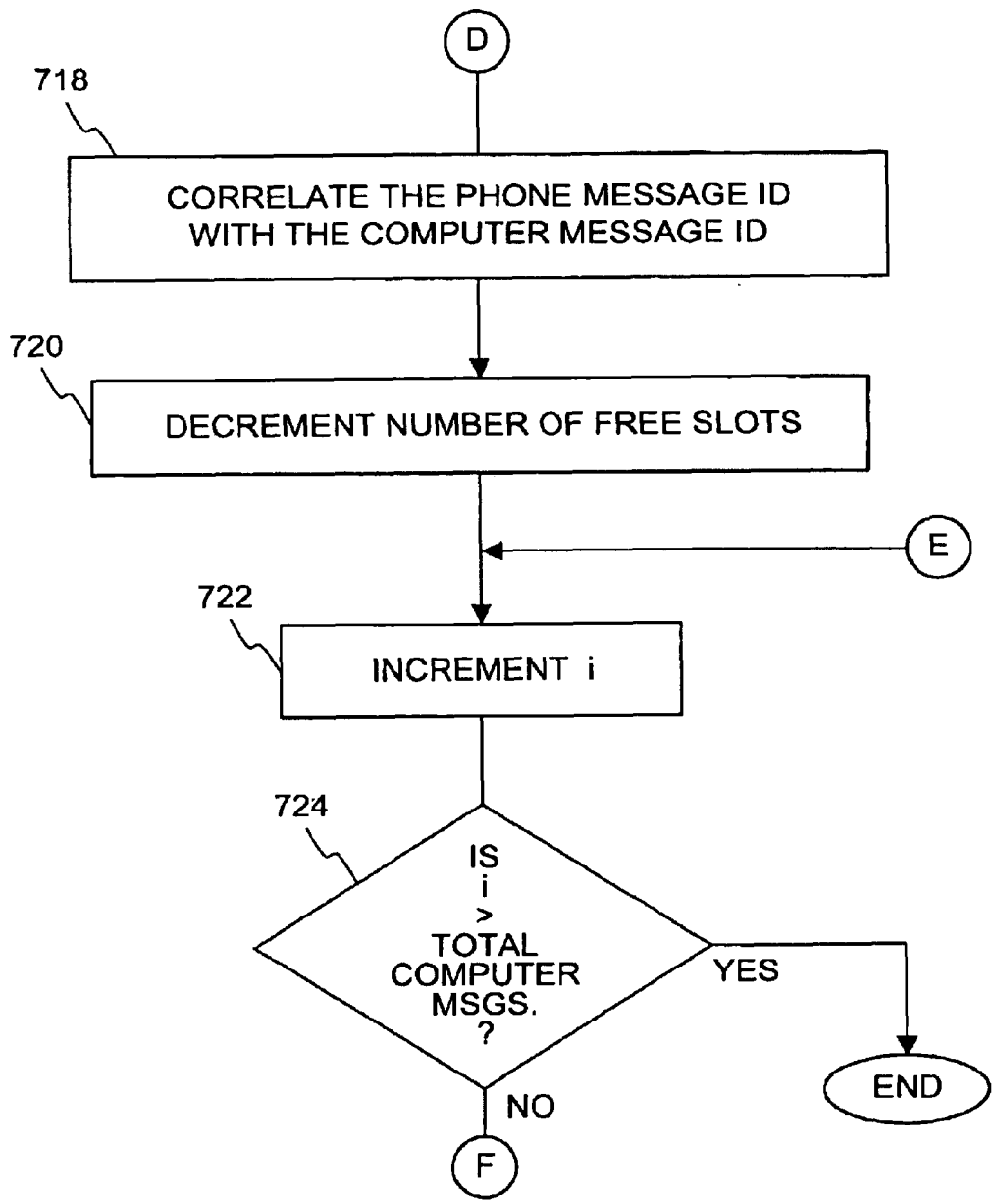

FIGS. 7A and 7B are flow diagrams of client-side pull synchronization 700 according to one embodiment of the invention. The pull synchronization 700 is, for example, performed by the mail synchronization client such as the mail synchronization client 118 illustrated in FIG. 1 or the mail synchronization client 208 illustrated in FIG. 2B. The pull synchronization 700 is an embodiment of the pull synchronization processing of block 324 illustrated in FIG. 3B with respect to the client-side as well as the pull synchronization processing of block 334 illustrated in FIG. 3C with respect to the client-side.

The pull synchronization 700 begins with a request for the number of free slots in the telephone's inbox from the mail synchronization server at block 702. Next, a decision block 704 determines whether the number of free slots has been received from the mail synchronization server. Once the decision block 704 determines that the number of free slots has been received, an index (i) is set to zero (0) at block 706. Following block 706, a decision block 708 determines whether the number of free slots is greater than zero. When the decision block 708 determines that the number of free slots is not greater than zero, then the pull synchronization 700 is complete and ends because there is no need for further processing because the telephone inbox is currently full. The normalization processing 600 previously make those of the messages remaining in the telephone's inbox be the same as certain of the messages in the computer's inbox which are in an initial portion of the computer's inbox corresponding to the size of the telephone inbox.

On the other hand, when the decision block 708 determines that there are free slots available in the telephone's inbox, then additional processing is performed. In particular, a decision block 710 determines whether the computer message (i) is in the telephone's inbox. Again, in one embodiment, the client mapping table 212 can be used to rapidly determine whether the computer message (i) of the computer's inbox is within the telephone's inbox.

When the computer message (i) is not in the telephone's inbox, then processing is performed to insert the message associated with computer message (i) into the telephone's inbox. Specifically, an insert transaction request is prepared at block 712. The insert transaction request is a request to insert a new telephone message corresponding to the computer message (i) into the telephone's inbox. Next, the insert transaction request is sent at block 714 to the mail synchronization server. Preferably, the insert transaction request is sent to the mail synchronization server using the previously established secure connection (FIG. 3A, block 302). Then, a decision block 716 determines whether the mail synchronization server has acknowledged the insert transaction request and provided a telephone message identifier (ID) for the message. Once the decision block 716 determines that the acknowledgment and the telephone message ID have been received, then the telephone message ID is correlated with the computer message ID at block 718. This correlation can also be referred to as an association or mapping between the telephone message identifier and the computer message identifier. In one embodiment, the telephone message ID is the controlling identifier and the computer message ID is mapped to the telephone message ID. As noted above, in one embodiment, these mappings can be stored in the client mapping table 212 illustrated in FIG. 2B. Next, the number of free slots is decremented at block 720 because one of the previously available free slots has been filled. In addition, the index (i) is incremented at block 722. Following block 722, a decision block 724 determines whether the index (i) is greater than the total number of computer messages. When the decision block 724 determines that the index (i) is not greater than the total number of computer messages, the pull synchronization 700 returns to repeat the decision block 708 and subsequent blocks. Alternatively, when the decision block 724 determines that the index (i) is greater than the total number of computer messages, then the pull synchronization 700 is complete and ends.

On the other hand, when the decision block 710 determines that the computer message (i) is already in the telephone's inbox, then the pull synchronization processing 700 bypasses the blocks 712–720. Blocks 712–720 are able to be bypassed because there is no need for an insertion of a message into the telephone's inbox because the message is already present in the telephone's inbox.

Figure 8:
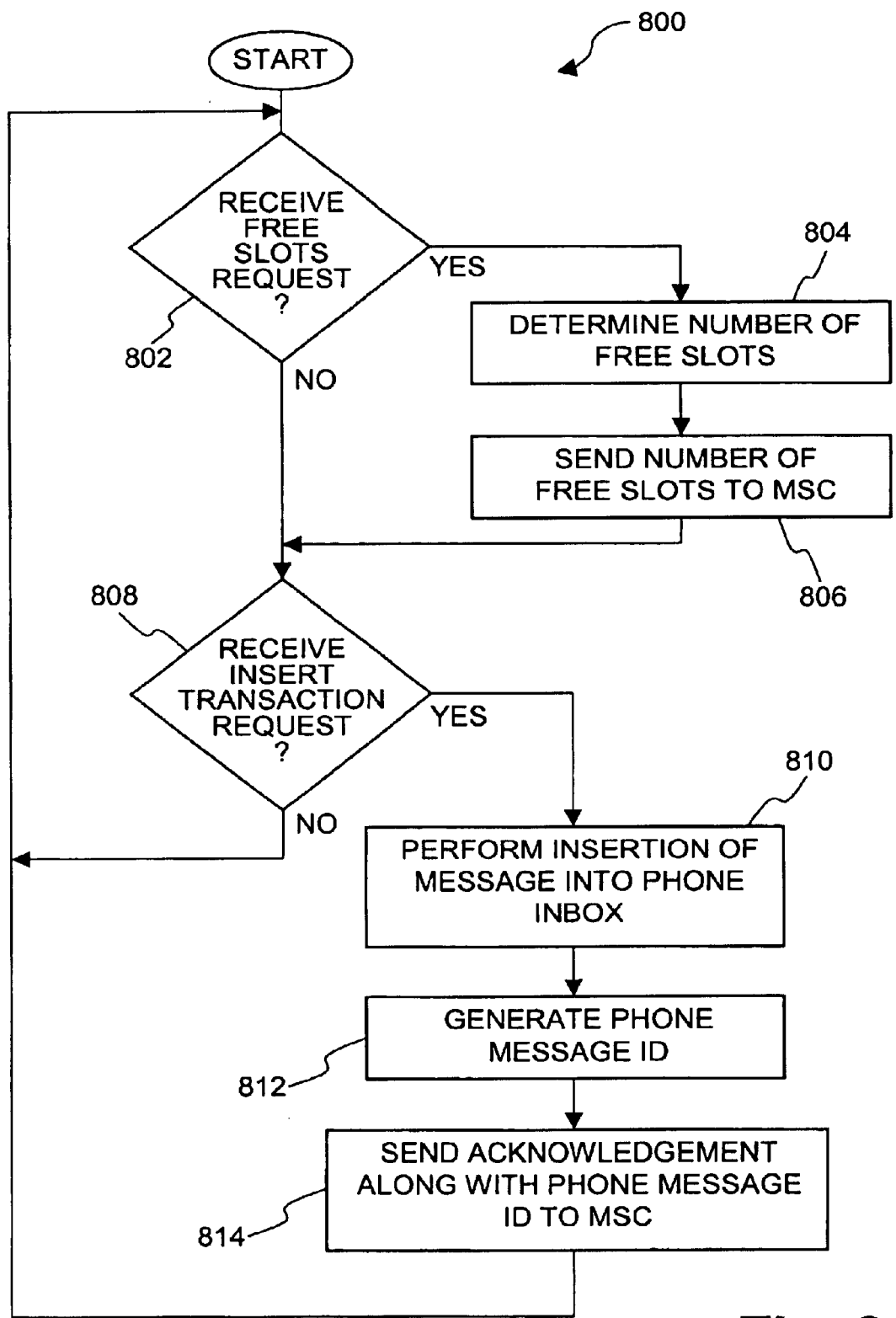
FIG. 8 is a flow diagram of server-side pull synchronization according to one embodiment of the invention.

FIG. 8 is a flow diagram of server-side pull synchronization 800 according to one embodiment of the invention. The pull synchronization 800 is, for example, performed by a mail synchronization server, such as the mail synchronization server 206 illustrated in FIG. 2A or the mail synchronization server 216 illustrated in FIG. 2C. The pull synchronization 800 is an embodiment of the pull synchronization processing of block 326 illustrated in FIG. 3B with respect to the server-side as well as the pull synchronization processing of block 334 illustrated in FIG. 3C with respect to the server-side.

The pull synchronization 800 begins with a decision block 802 that determines whether a free slots request has been received from the mail synchronization client. When the decision block 802 determines that a free slots request has been received from the mail synchronization client, then the number of free slots is determined at block 804. The number of free slots is then sent at block 806 to the mail synchronization client. On the other hand, when the decision block 802 determines that a free slots request has not been received, then block 804 and 806 are bypassed.

Following the decision block 802 when the free slots request is not received as well as following the block 806 when the free slots request is received, a decision block 808 determines when an insert transaction request has been received. When the decision block 808 determines that an insert transaction request has not been received from the mail synchronization client, then the pull synchronization 800 returns to repeat the decision block 802 and subsequent blocks so that the processing of subsequently received requests can be processed. On the other hand, when the decision block 808 determines an insert transaction request has been received from the mail synchronization client, the insertion of a message into the telephone inbox is performed at block 810. Then, a telephone message ID is generated at block 812. Thereafter, an acknowledgment along with the telephone message identifier is sent at block 814 to the mail synchronization client. Following block 814, the pull synchronization 800 returns to repeat the decision block 802 and subsequent blocks so that subsequently received requests may be processed.

Figure 9A:
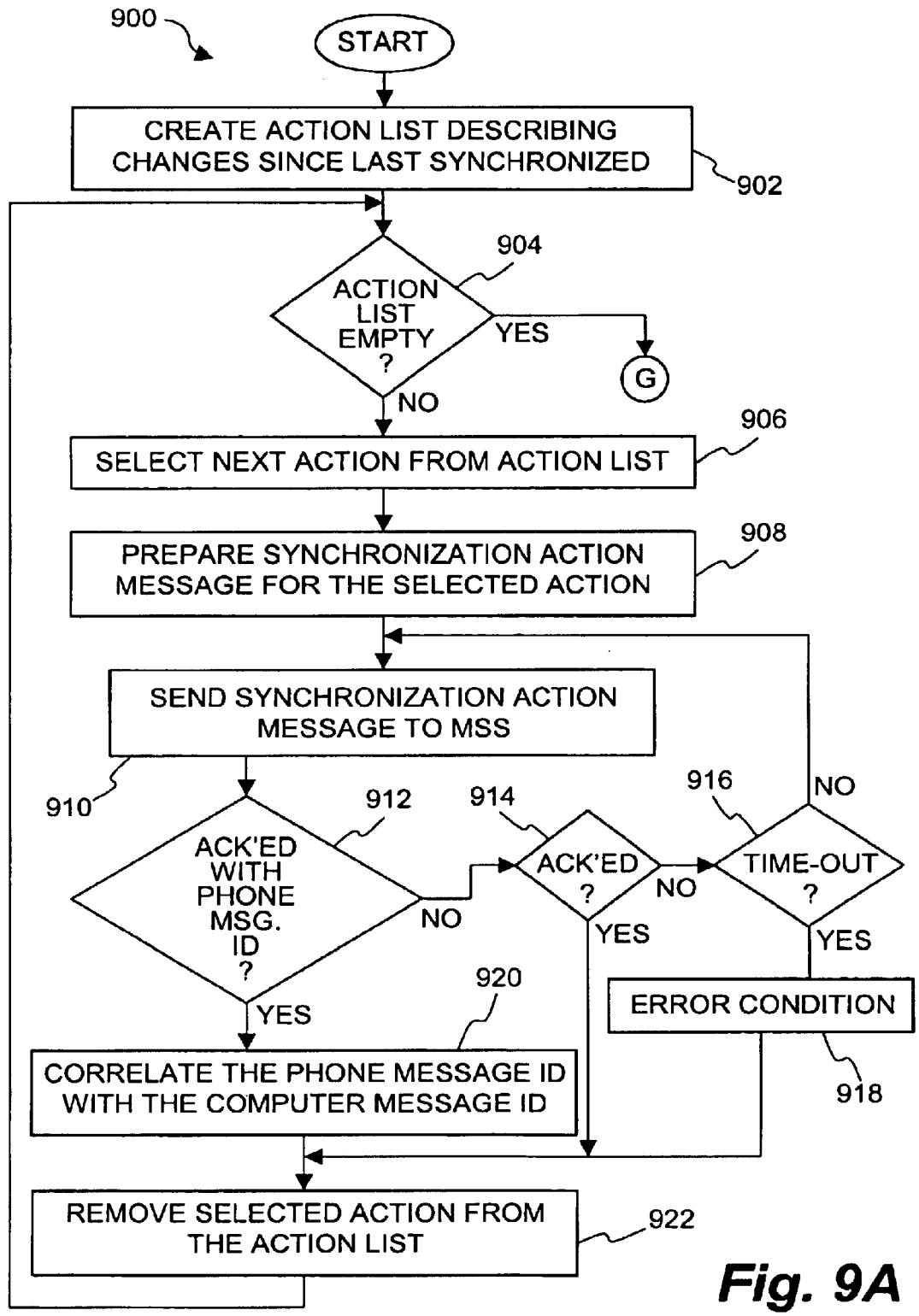
FIGS. 9A and 9B are flow diagrams of client-side update synchronization processing according to one embodiment of the invention.
Figure 9B:
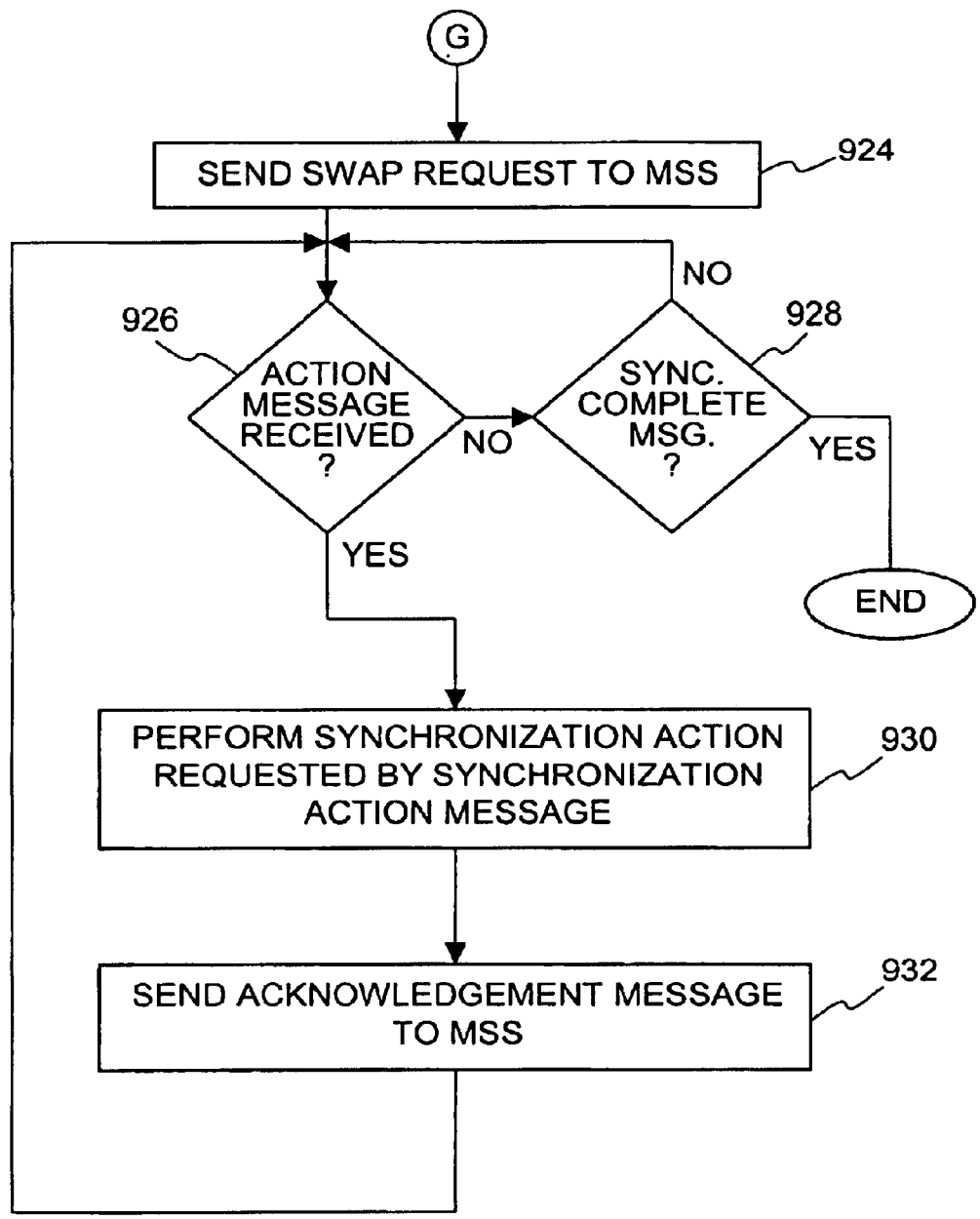

FIGS. 9A and 9B are flow diagrams of client-side update synchronization processing 900 according to one embodiment of the invention. The client-side update synchronization processing 900 is, for example, performed by a mail synchronization client, such as the mail synchronization client 118 illustrated in FIG. 1 or the mail synchronization client 208 illustrated in FIG. 2B. The client-side update synchronization processing 900 is an embodiment of the processing performed in block 310 illustrated in FIG. 3A with respect to the client-side.

The client-side update synchronization processing 900 initially creates an action list at block 902. The action list describes changes that have occurred since the last synchronization. The action list can be generated in a variety of ways. One way the action list can be generated is by tracking all the events that occur with respect to the local mail server associated with the mail synchronization client since the last synchronization. In one embodiment, the action list is limited to changes with respect to an inbox. In other embodiments, the action list is not limited to changes with respect to the inbox but can also include, for example, changes to an outbox. Another way of generating or creating the action list is to save the state of the inbox (outbox) of the local mail server when synchronization begins, and then the next time synchronization is to begin, a comparison between the saved inbox (outbox) and the current inbox (outbox) is made and the differences are converted into action items within the action list.

Following block 902, a decision block 904 determines whether the action list is empty. At this point, we will assume that the action list is not empty and that there are actions within the action list that are to be processed. Hence, when the action list is not empty, a next action is selected from the action list at block 906. Initially, the first action from the action list would be selected. Then, a synchronization action message is prepared at block 908 for the selected action. The synchronization action message is then sent to the mail synchronization server at block 910. Preferably, the synchronization action message is sent to the mail synchronization server using the previously established secure connection (FIG. 3A, block 302). The synchronization action message can request that the mail synchronization server to perform a variety of actions or operations, including insertion of a new message, mark a message as read or unread, move message to a trash area, recover message from the trash area, or destroy message.

Following block 910, a decision block 912 determines whether the mail synchronization server has acknowledged the synchronization action message and provided a telephone message ID. For example, in the case in which the action message required an insertion of a message, the mail synchronization client would expect to receive in response an acknowledgement and a telephone message ID from the mail synchronization server. When a decision block 912 determines that mail synchronization server has not acknowledged the synchronization action message together with a telephone message ID, a decision block 914 determines whether the mail synchronization server has merely acknowledged the synchronization action message. When the decision block 914 determines that the mail synchronization server has not yet acknowledged the synchronization action message, then a decision block 916 determines whether a time-out has occurred. If a time-out has not occurred, the client-side update synchronization processing 900 returns to repeat the block 910 and subsequent blocks so that the synchronization action message can be sent if desired. Alternatively, when the decision block 916 determines that a time-out has occurred, an error condition is noted at 918.

On the other hand, when the decision block 912 determines that the mail synchronization server has acknowledged the synchronization action message and provided a telephone message ID, the telephone message ID is correlated with the computer message identifier at block 920. Following block 920, following the decision block 914 when the mail synchronization server has simply acknowledged the synchronization action message, and following the block 918, the selected action is removed from the action list at block 922. Following block 922, the client-side update synchronization processing 900 returns to repeat the decision block 904 and subsequent blocks so that additional action items in the action list can be processed.

Upon repeating the decision block 904, the action list will eventually be empty because all of the action items in the action list have been processed. Hence, when the decision block 904 determines that the action list is empty, then a swap request is sent to the mail synchronization server at block 924. The swap request signals the mail synchronization server to perform its synchronization operations. Hence, so far, the actions that have occurred on the client-side are passed on to the server-side which is then updated, now the actions that have occurred on the server-side are provided to the client-side which is then updated.

Following block 924, a decision block 926 determines whether an action message has been received. Here, the client-side update synchronization processing 900 is awaiting the receipt of an action message from the mail synchronization server. When the decision block 926 that an action message has not been received, then a decision block 928 determines whether a synchronization complete message has been received. A synchronization complete message is sent when the synchronization is completed and the client-side update synchronization processing 900 is to end. In one embodiment, the synchronization complete message can be a swap message.

Thus, when the decision block 928 determines that the synchronization complete message has been received, the client-side update synchronization processing 900 is complete and ends. Alternatively, when the decision block 928 determines that the synchronization complete message has not been received, then the client-side update synchronization processing 900 returns to repeat the decision block 926 and subsequent blocks so that subsequently received messages can be processed.

Once the decision block 926 determines that an action message has been received, then a synchronization action that is requested by the synchronization action message is performed at block 930. The synchronization action message can request a variety of different synchronization actions, including insertion of a new message, mark a message as read or unread, move message to a trash area, recover message from the trash area, unmap message no longer on the mail synchronization server, or delete a message. If an action for the insertion of a new message is received, that server message ID is correlated with the client message ID. Following block 930, an acknowledgment message is sent at block 932 to the mail synchronization server. Preferably, the acknowledgement message is sent to the mail synchronization server using the previously established secure connection (FIG. 3A, block 302). Following the block 932, the client-side update synchronization processing 900 returns to repeat the decision block 926 and subsequent blocks so that additional action messages are able to be processed upon their receipt.

Figure 10A:
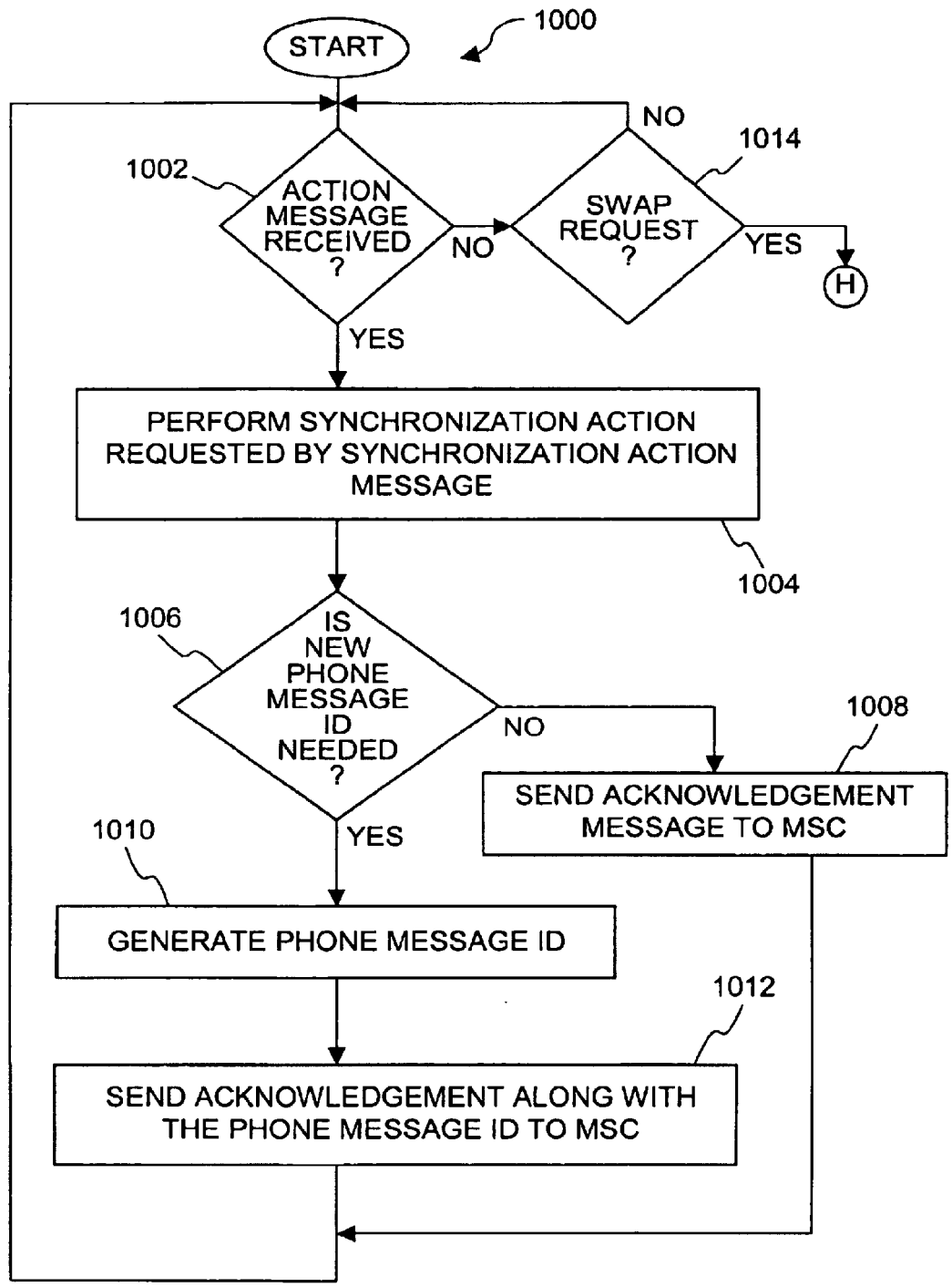
FIGS. 10A and 10B are flow diagrams of server-side update synchronization processing according to an embodiment of the invention.
Figure 10B:
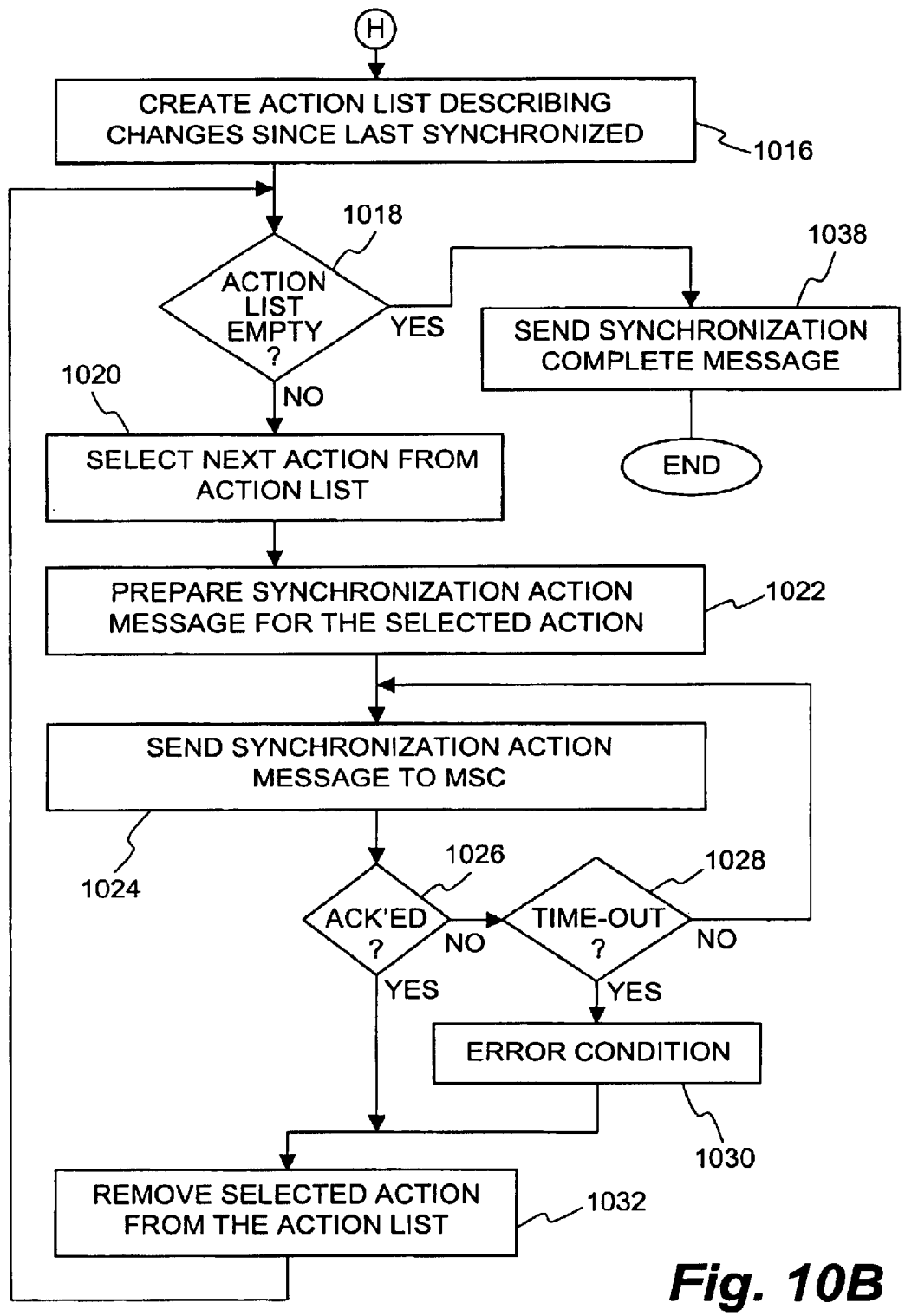

FIGS. 10A and 10B are flow diagrams of server-side update synchronization processing 1000 according to an embodiment of the invention. The server-side update synchronization processing 1000 is, for example, performed by a mail synchronization server, such as the mail synchronization server 206 illustrated in FIG. 2B or the mail synchronization server 216 illustrated in FIG. 2C. The server-side update synchronization processing 1000 is an embodiment of the processing performed in block 310 illustrated in FIG. 3A with respect to the server-side.

The server-side update synchronization processing 1000 begins with a decision block 1002 that determines whether an action message has been received. When the decision block 1002 determines that an action message has been received, a synchronization action requested by the synchronization action message is performed at block 1004. Then, a decision block 1006 determines whether a new telephone message ID is needed. When the decision block 1006 determines that a new telephone message ID is not needed, then an acknowledgment message is sent to the mail synchronization client at block 1008. Alternatively, when the decision block 1006 determines that a new telephone message ID is needed, a telephone message ID is generated at block 1010. Then, at block 1012, an acknowledgment along with the telephone message ID are sent to the mail synchronization client. Following block 1012, as well as following the block 1008, the server-side update synchronization processing 1000 returns to repeat the decision block 1012 and subsequent blocks.

On the other hand, when the decision block 1002 determines that an action message has not been received, a decision block 1014 determines whether a swap request has been received. The swap request from the mail synchronization client informs the mail synchronization server that it should perform its synchronization operations. Hence, so far, the actions that have occurred on the client-side are passed on to the server-side which is then updated, now the actions that have occurred on the server-side are provided to the client-side which is then updated.

When the decision block 1014 determines that a swap request has not been received, then the server-side update synchronization processing 1000 returns to repeat the decision block 1002 and subsequent blocks. However, when the decision block 1014 determines that a swap request has been received, then the mail synchronization server operates to process the changes that have occurred on the server-side so that the client-side is updated in accordance therewith. In particular, an action list describing changes since the last synchronization is created at block 1016. Typically, the action list at the server-side is created as the changes or alterations are being made to the server-side mail server (e.g., inbox or outbox). Hence, when the swap request is received, the action list may already be prepared. Following block 1016, a decision block 1018 determines whether the action list is empty. At this point, it is assumed that the action list is not initially empty. Hence, when the decision block 1018 determines that the action list is not empty, then a next action is selected 1020 from the action list. Initially, the first action in the action list would be selected. Next, a synchronization action message is prepared for the selected action at block 1022. The synchronization action message is then sent at block 1024 to the mail synchronization client. After block 1024, a decision block 1026 determines whether the mail synchronization client has acknowledged the synchronization action message. When the decision block 1026 determines that an acknowledgment has not been received, a decision block 1028 determines whether a time-out has occurred. When the decision block 1028 determines that a time-out has not yet occurred, the server-side update synchronization processing 1000 returns to repeat the block 1024 and subsequent blocks. Alternatively, when the decision block 1028 determines that a time-out has occurred, an error condition is noted at block 1030. Following the block 1030 or following the decision block 1026 when an acknowledgment has been received from the mail synchronization client, the selected action is removed from the action list at block 1032. Following the block 1032, the server-side update synchronization processing 1000 returns to repeat the decision block 1018 and subsequent blocks. Once the decision block 1018 determines that the action list is empty, then a synchronization complete message is sent at block 1038. In one embodiment, the synchronization complete message can be a swap message. At this point, the update synchronization processing at both the client-side and server-side are complete.

An exemplary synchronization of a computer's inbox with a telephone's inbox is now described to further detail the operation of the invention. Initially, assume that the respective contents of the computer's inbox and the telephone's inbox are as follows. The telephone's inbox is often limited in size (e.g., only six mail slots) due to resource constraints, at least as compared to the size of the computer's inbox.

| COMPUTER | | TELEPHONE | |
|---|---|---|---|
| SLOT | ID | SLOT | ID |
| 1 | C1 | 1 | 21 |
| 2 | C2 | 2 | 54 |
| 3 | C3 | 3 | 7 |
| 4 | C4 | 4 | 14 |
| 5 | C5 | 5 | 70 |
| 6 | C6 | 6 | — |
| 7 | C7 | | |
| 8 | C8 | | |
| 9 | C9 | | |
| 10 | C10 | | |
| . | | | |
| . | | | |
| . | | | |

In this example, the computer's inbox initially contains messages in slots 1–10 and the remaining slots are open. Normally, inbox displays only message descriptors such as a subject line and a sender. The messages in slots 1–10 are also identified in the computer system by computer identifiers C1–C10. In contrast, the telephone's inbox initially contains messages in slots 1–5 and the sixth slot remains open. The messages in slots 1–6 of the telephone's inbox are identified in the telephone by telephone message identifiers 21, 54, 7, 14 and 70.

Next, the computer's inbox and the telephone's inbox undergo initial synchronization (e.g., block 322, FIG. 3B). Here, the messages in the telephone's inbox but not in the computer's inbox are retrieved from the mail synchronization server and inserted into the computer's inbox. In this example, the messages having the telephone message identifiers 21, 54, 7, 14 and 70 are retrieved and inserted into the computer's inbox and assigned computer message identifiers C11–C15, respectively. Also, mappings for these messages are established and stored at the mail synchronization client. The mapping associates telephone message identifiers with computer message identifiers. Here, the inserted messages at the computer's inbox are reordered in date order (e.g., date received). In this example, slot 3 of the computer's inbox now contains the message having the message identifier C11, messages C3–C10 are shifted down one slot, and slots 12–15 are now filled.

| COMPUTER | | | TELEPHONE | |
|---|---|---|---|---|
| SLOT | ID | MAPPING | SLOT | ID |
| 1 | C1 | | 1 | 21 |
| 2 | C2 | | 2 | 54 |
| 3 | C11 | 21 | 3 | 7 |
| 4 | C3 | | 4 | 14 |
| 5 | C4 | | 5 | 70 |
| 6 | C5 | | 6 | |
| 7 | C6 | | | |
| 8 | C7 | | | |
| 9 | C8 | | | |
| 10 | C9 | | | |
| 11 | C10 | | | |
| 12 | C12 | 54 | | |
| 13 | C13 | 7 | | |
| 14 | C14 | 14 | | |
| 15 | C15 | 70 | | |

Next, the computer's inbox and the telephone's inbox undergo normalization processing (e.g., block 324, FIG. 3B). With the normalization processing in this example, four (4) messages are deleted from the telephone inbox (message identifiers 54, 7, 14 and 70), leaving only the message having the telephone message identifier 21 in slot 1 of the telephone's inbox. Also, the mappings associated with the deletions are removed from the computer's inbox. Because the deletion of the messages is done to make room available on in the telephone's box, the mappings are removed from the computer's inbox but the messages are not destroyed from the computer. After the normalization processing, the computer's inbox and the telephone's inbox are as follows.

| COMPUTER | | | TELEPHONE | |
|---|---|---|---|---|
| SLOT | ID | MAPPING | SLOT | ID |
| 1 | C1 | | 1 | 21 |
| 2 | C2 | | 2 | — |
| 3 | C11 | 21 | 3 | — |
| 4 | C3 | | 4 | — |
| 5 | C4 | | 5 | — |
| 6 | C5 | | 6 | — |
| 7 | C6 | | | |
| 8 | C7 | | | |
| 9 | C8 | | | |
| 10 | C9 | | | |
| 11 | C10 | | | |
| 12 | C12 | | | |
| 13 | C13 | | | |
| 14 | C14 | | | |
| 15 | C15 | | | |

Following the normalization, pull synchronization is performed to fill up the telephone's inbox with messages from the computer's inbox such that the same list of messages appear in both the inboxes. After the pull synchronization is performed, the computer's inbox and the telephone's inbox are as follows.

| COMPUTER | | | TELEPHONE | |
|---|---|---|---|---|
| SLOT | ID | MAPPING | SLOT | ID |
| 1 | C1 | 100 | 1 | 100 |
| 2 | C2 | 16 | 2 | 16 |
| 3 | C11 | 21 | 3 | 21 |
| 4 | C3 | 58 | 4 | 58 |
| 5 | C4 | 2 | 5 | 2 |
| 6 | C5 | 115 | 6 | 115 |
| 7 | C6 | | | |
| 8 | C7 | | | |
| 9 | C8 | | | |
| 10 | C9 | | | |
| 11 | C10 | | | |
| 12 | C12 | | | |
| 13 | C13 | | | |
| 14 | C14 | | | |
| 15 | C15 | | | |

At this point, the initial synchronization is completed. Thereafter, update synchronization is performed periodically to maintain the synchronized state of the computer's inbox and the telephone's inbox because a user could interact with either in the context of reading, sending, receiving, deleting or recovering messages.

When the periodic time for update synchronization arrives, the update synchronization is performed without any need for user interaction. At this point, assume that the computer's inbox is as follows.

| COMPUTER | | |
|---|---|---|
| SLOT | ID | MAPPING |
| 1 | C2 | 16 |
| 2 | C11 | 21 |
| 3 | C3 | 58 |
| 4 | C4 | 2 |
| 5 | C5 | 115 |
| 6 | C6 | |
| 7 | C7 | |
| 8 | C8 | |
| 9 | C9 | |
| 10 | C10 | |
| 11 | C12 | |
| 12 | C13 | |
| 13 | C14 | |
| 14 | C15 | |
| 15 | — | |

Here, comparing the computer's inbox with its state following completion of the initial synchronization (or last synchronization) indicates that two changes have taken place. The two changes are (1) that computer message having the computer message identifier C1 was deleted by the user interacting with the mail system at the computer system, and (2) that computer message having the computer message identifier C2 was read and is now marked as read. In this embodiment, no distinction is made as to whether messages are read or unread; hence, the message identifier C2 remains in its same relative position with respect to the other messages in the computer's inbox. However, other embodiments could list unread messages before read messages. Accordingly, the action list associated with the mail synchronization client for this example could be as follows.

ACTION LIST: (for Client)
DELETE MSG (100)
MARK MSG (16) READ

The action list can be determined by tracking events affecting the computer's inbox or constructing the action list by comparing the states of the computer's inbox.

Based on the action list associated with the mail synchronization client, the telephone's inbox is updated and becomes as follows. Namely, the message having the telephone message identifier 100 is deleted from the telephone inbox. The marking of the message having the telephone message identifier 16 is not shown but typically causes the message descriptor to graphically indicate same.

| TELEPHONE | |
|---|---|
| SLOT | ID |
| 1 | 129 |
| 2 | 16 |
| 3 | 21 |
| 4 | 58 |
| 5 | 115 |
| 6 | |

Thereafter, a swap command is issued and the mail synchronization sever processes the update synchronization with respect to the telephone's inbox. Prior to beginning the update synchronization, assume that the telephone inbox was as follows.

| TELEPHONE | |
|---|---|
| SLOT | ID |
| 1 | 129 |
| 2 | 100 |
| 3 | 16 |
| 4 | 21 |
| 5 | 58 |
| 6 | — |

The change that has occurred at the time when the update synchronization begins (since last synchronization) is that a message having the telephone message identifier 129 has been inserted into the telephone's inbox. Through a comparison of inbox states or tracking changes, the action list for the mail synchronization server is as follows.

ACTION LIST: (for Server)
INSERT MSG. (129)
DELETE MSG (2)

The computer's inbox is then updated in accordance with the action list from the mail synchronization server. Specifically, a new message C16 is added to the computer's inbox and is mapped to the telephone message identifier 129.

| COMPUTER | | |
|---|---|---|
| SLOT | ID | MAPPING |
| 1 | C16 | 129 |
| 2 | C2 | 16 |
| 3 | C11 | 21 |
| 4 | C3 | 58 |
| 5 | C5 | 115 |
| 6 | C6 | |
| 7 | C7 | |
| 8 | C8 | |
| 9 | C9 | |
| 10 | C10 | |
| 11 | C12 | |
| 12 | C13 | |
| 13 | C14 | |
| 14 | C15 | |
| 15 | — | |

Then, pull synchronization is performed to fill up the telephone's inbox with messages from the computer's inbox such that the same list of messages appear in both the inboxes. Here, the telephone message identifier 95 is added to slot 6 of the telephone's inbox and mapped in the computer's inbox. After the pull synchronization is performed, the computer's inbox and the telephone's inbox are as follows. At this point, the synchronization has been updated so that messages in the telephone's inbox match the corresponding slots of the computer's inbox (to the extent of the size of the telephone's inbox).

| COMPUTER | | | TELEPHONE | |
|---|---|---|---|---|
| SLOT | ID | MAPPING | SLOT | ID |
| 1 | C2 | 129 | 1 | 129 |
| 2 | C11 | 21 | 2 | 21 |
| 3 | C3 | 58 | 3 | 58 |
| 4 | C5 | 115 | 4 | 115 |

-continued

| COMPUTER | | | TELEPHONE | |
|---|---|---|---|---|
| SLOT | ID | MAPPING | SLOT | ID |
| 5 | C6 | 19 | 5 | 19 |
| 6 | C7 | 95 | 6 | 95 |
| 7 | C8 | | | |
| 8 | C9 | | | |
| 9 | C10 | | | |
| 10 | C12 | | | |
| 11 | C13 | | | |
| 12 | C14 | | | |
| 13 | C15 | | | |
| 14 | — | | | |
| 15 | — | | | |

Another aspect of the invention pertains to techniques that allow a user to initiate a synchronization operation from a mobile device. Typically, as noted above with respect to the initial aspect of the invention, synchronization operations are triggered automatically and thus without user interaction. The user can, however, configure when or how frequently they desire such synchronizations to occur. The automatic triggering occurs from a client side, namely the mail synchronization client, because the assumed presence of a firewall. A firewall (see block 122, FIG. 1) is typically present to securely couple a local network (e.g., intranet) to the Internet. Such firewalls disallow all network traffic, except electronic mail, from outside of a local network. As a result, when a firewall is present, a mobile device or its user would be unable to initiate a synchronization operation. Such a manual synchronization request from the mobile device would, for example, be useful for a user that has configured a relatively long synchronization interval, but the user wants to in the interim was to be guaranteed they are current when reading and sending electronic mail from the mobile device.

According to this aspect of the invention, the mobile device or its user is able to manually initiate a synchronization operation by selecting a synchronization command, button or icon on the mobile device. The effect of the selection is that the mobile device sends a special synchronization electronic mail message to the local mail system. The special synchronization electronic mail message can take a variety of forms such as containing a special word or number in an address, a subject line or body of the special synchronization electronic mail message. The special synchronization electronic mail message is able to pass through a firewall which may be present to safeguard the local network. The mail synchronization client is then able to recognize the receipt of this message and trigger a synchronization operation (session) in response thereto. Thereafter, the special synchronization electronic mail message is deleted from the local mail system (e.g., from the computer's inbox) as the user would have no interest in seeing such a message.

Figure 11A:
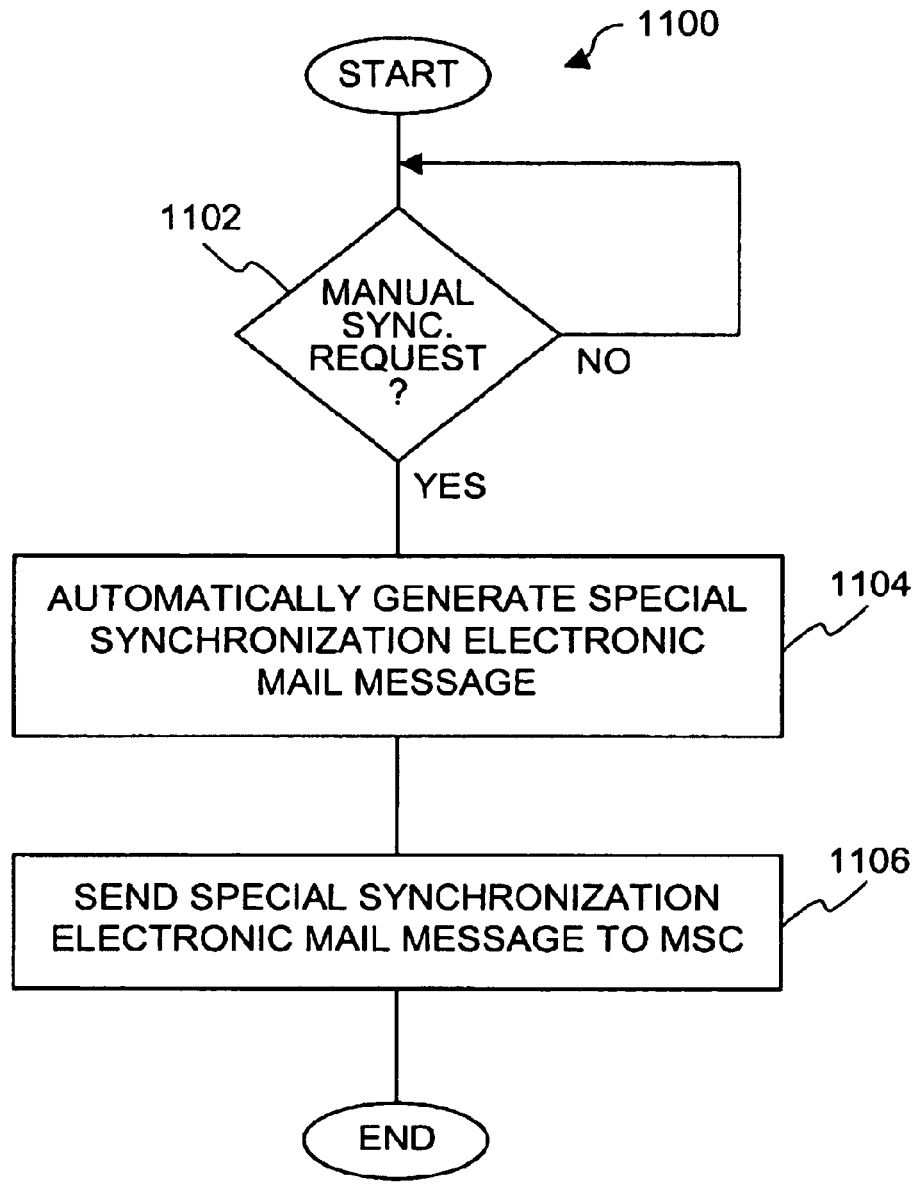
FIG. 11A is a flow diagram of server-side synchronization initiation processing according to one embodiment of the invention.

FIG. 11A is a flow diagram of server-side synchronization initiation processing 1100 according to one embodiment of the invention. The server-side synchronization initiation processing 1100 is, for example, performed by the mail synchronization server 206 illustrated in FIG. 2A or the mail synchronization server 216 illustrated in FIG. 2C. The server-side synchronization initiation processing 1100 begins with a decision block 1102 that determines whether a manual synchronization request has been received. Here, the decision block 1102 operates to determine if the user of the mobile device has requested a synchronization operation by selecting a command, button, icon or other indicator associated with the mobile device. In any case, when such a synchronization request has been received, the server-side synchronization initiation processing 1100 is effectively invoked. Once invoked, a special synchronization electronic mail message is automatically generated at block 1104. Then, the special synchronization electronic mail message is sent to the mail synchronization client at block 1106. Following block 1106, the server-side synchronization initiation processing 1100 is complete and ends.

Figure 11B:
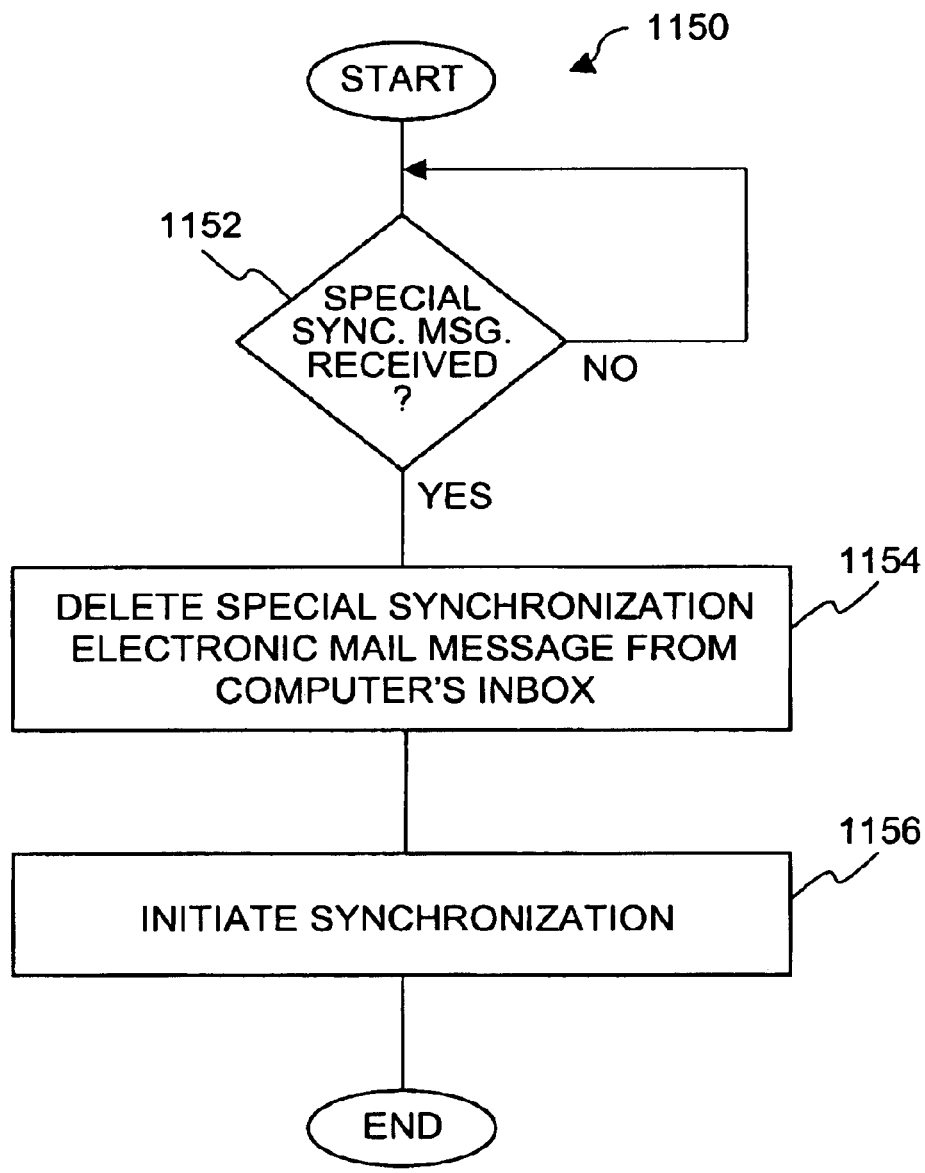
FIG. 11B is a flow diagram of client-side synchronization initiation processing according to one embodiment of the invention.

FIG. 11B is a flow diagram of client-side synchronization initiation processing 1150 according to one embodiment of the invention. The client-side synchronization initiation processing 1150 is, for example, performed by the mail synchronization client 118 illustrated in FIG. 1 or the mail synchronization client 208 illustrated in FIG. 2B. The client-side synchronization initiation processing 1150 begins with a decision block 1152 that determines whether a special synchronization message has been received within the local mail system. Recall, the special synchronization electronic mail message is sent to the mail synchronization in block 1106 of FIG. 11A. In particular, the decision block 1152 can determine whether the special synchronization message has been received at the computer's inbox. Once the special synchronization message is determined to have been received, the client-side synchronization initiation processing 1150 is effectively invoked. Once invoked, the special synchronization electronic mail message is deleted from the computer's inbox at block 1154. The deletion of the special synchronization electronic mail message is performed because the user has no desire to read such a message. Next, a synchronization operation (session) is initiated at block 1156. The synchronization operation can proceed as discussed above with respect to FIG. 3A and subsequent figures. Following block 1156, the client-side synchronization initiation processing 1150 is complete and ends.

Another aspect of the invention pertains to the ability to automatically synchronize outgoing electronic mail between a mobile device and a personal computer (e.g., desktop computer). Often, electronic mail is created for internal networks (e.g., intranets) or external networks (e.g., Internet). Depending upon the particular type of network, the electronic mail address could differ. Also, when electronic mail is sent over the Internet, there is a loss of security because the Internet a public network. In contrast, electronic mail sent over an intranet tends to be protected within the region of the intranet which typically is limited to that of a business. Also, electronic mail addresses in the user's intranet mail system may or may not be compatible with the electronic mail addresses used in the mobile device, and the user's intranet mail system may or may not have a gateway to a data network that the mobile device is connected to. Hence, there is a need to facilitate a mobile device in sending electronic mail in a secure manner to users on an intranet that is associated with a user's personal computer (e.g., desktop computer) of the user.

Figure 12:
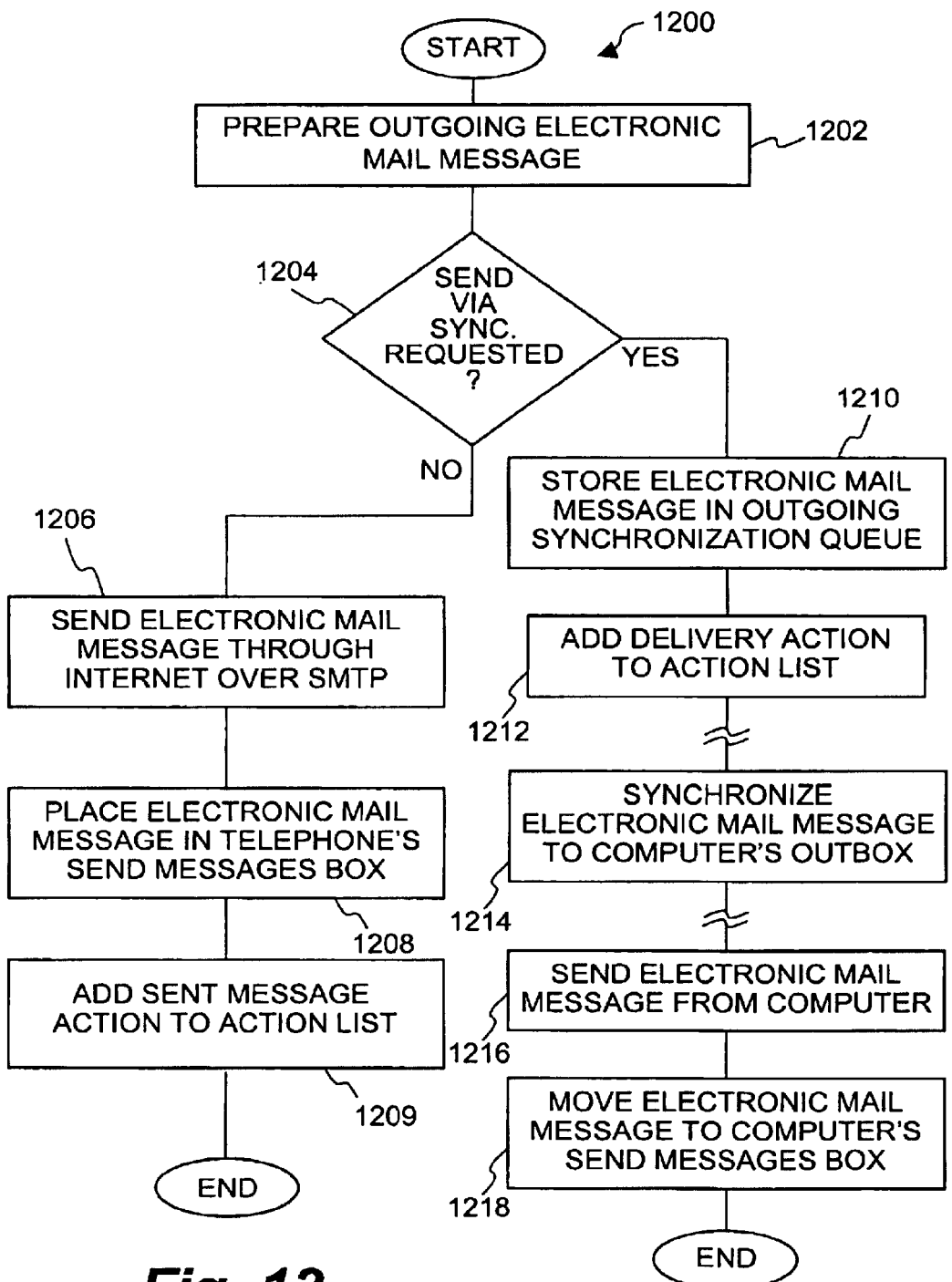
FIG. 12 is a flow diagram of outgoing mail synchronization processing according to an embodiment of the invention.

FIG. 12 is a flow diagram of outgoing mail synchronization processing 1200 according to an embodiment of the invention. The outgoing mail synchronization processing 1200 is primarily performed by a mail synchronization server, such as the mail synchronization 206 illustrated in FIG. 2A or the mail synchronization server 216 illustrated in FIG. 2C. The outgoing mail synchronization processing 1200 begins when a message is to be composed and then sent from the mobile device. Hence, the outgoing mail synchronization processing 1200 initially prepares an outgoing electronic mail message at block 1202. Then, at decision block 1204, a decision is made as to whether the user has requested that the outgoing electronic mail message be sent via synchronization.

When the decision block 1204 determines that the outgoing electronic mail message is not to be sent via synchronization, the outgoing electronic mail message is sent from the mobile device in a conventional fashion. Specifically, the electronic mail message is sent through the Internet over Small Message Transport Protocol (SMTP) at block 1206. Here, the electronic mail message is sent over the public network (e.g., the Internet) using the conventional protocol SMTP and is done so in an unsecure manner. Next, the electronic mail message is placed in the telephone's send messages box at block 1208. A sent message action is then added to the action list so that the message that has been sent can be copied to the computer's send message box upon synchronization. Following block 1209, the outgoing mail synchronization processing 1200 is complete and ends in a case in which the outgoing electronic mail message was not requested to be sent during synchronization.

On the other hand, when the decision block 1204 determines that the outgoing electronic mail message is to be sent during synchronization, then the sending of the outgoing electronic mail message is deferred until the next synchronization operation (session) occurs. Specifically, the electronic mail message is stored in an outgoing synchronization queue at block 1210. As an example, the outgoing synchronization queue could be provided, for example, as an outgoing synchronization queue 121 in the mail synchronization server 216 illustrated in FIG. 2. Next, a delivery action is added to the action list associated with the mail synchronization server at block 1212. The delivery action is a synchronization action that (after being sent by the mail synchronization server during the synchronization operation) informs the mail synchronization client that delivery of the associated message has been requested during synchronization.

Following block 1212, the outgoing mail synchronization processing 1200 is basically inactive until a synchronization operation occurs. It is during the synchronization operation in which the action list items, including the delivery action, are sent to and performed by the mail synchronization client as are other synchronization actions. At block 1214, the electronic mail message is synchronized to the computer's outbox. The block 1214 thus represents the performance of the delivery action by the mail synchronization client and server.

At this point, from the server-side, the outgoing mail synchronization processing 1200 is complete; however, from the client-side additional processing is performed. Namely, after the electronic mail message reaches the computer's outbox, the electronic mail message is sent from a computer at block 1216. By sending the electronic mail message from the computer, the local or intranet addresses are appropriate for use by the mobile phone, and the message is able to be transmitted within the intranet in a secure manner. Also note that the transmission of the electronic mail message during synchronization from the mail synchronization server to the client synchronization server through the Internet is performed in a secure manner as well. After block 1216, the electronic mail message is moved to the computer's send messages box at block 1218. The computer's send messages box stores those messages that have been sent from the computer. The computer's send messages box can also be synchronized with the telephone's send messages box if desired. Following block 1218, the outgoing mail synchronization processing 1200 is complete and ends for the situation in which the electronic mail message is to be sent during synchronization.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

Additional details on providing electronic mail services, including the use of network gateways or proxy servers, is contained in U.S. application Ser. No. 09/172,105, filed Oct. 13, 1998, and entitled "METHOD AND APPARATUS FOR PROVIDING ELECTRONIC MAIL SERVICES DURING NETWORK UNAVAILABILITY", the content of which is hereby incorporated by reference.

The advantages of the invention are numerous. Different embodiments or implementations may yield one or more of the following advantages. One potential advantage of the invention is that a user is able to use two different electronic mail accounts (mailboxes) as if they are the same electronic mail account. Another potential advantage of the invention is that the two different electronic mail accounts are able to be automatically synchronized without user interaction. Still another potential advantage of the invention is synchronization between two different electronic mail accounts can be achieved through a public network. Yet another potential advantage of the invention is that an outgoing message can be automatically sent from the mailbox that receives the message in conjunction with synchronization.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for synchronization of a second mail system and a first mail system, the second mail system communicating with the first mail system through a public network, said method comprising:

maintaining a first inbox for the first mail system, the first inbox having a first message list associated therewith;

establishing a secure connection between the first mail system and the second mail system through the public network;

requesting a second message list from the second mail system over the secure connection, the second message list being associated with a second inbox for the second mail system;

comparing the first message list with the second message list to identify missing messages, the missing messages are those messages that are identified as being present in the second inbox but not also present in the first inbox;

requesting the missing messages from the second mail system over the secure connection;

receiving the missing messages from the second mail system over the secure connection through the public network; and inserting the missing messages that have been received into the first inbox of the first mail system;

deleting at least one of the messages from the second inbox that are known to be present in the first inbox.

2. A method as recited in claim 1, wherein said method further comprises:

receiving at the second mail application over the secure connection, subsequent to said deleting, at least one message from the first inbox that is not already with in the second inbox; and inserting the at least one message from the first inbox into the second inbox.

3. A method as recited in claim 1, wherein following said deleting and said inserting, the message list associated with the second inbox matches a least a first set of the messages in the message list associated with the first inbox.

4. A method as recited in claim 2, wherein the number of messages deleted by said deleting equals the number of messages inserted by said inserting.

5. A method as recited in claim 1, wherein said method further comprises:

subsequently receiving at the second mail application over the secure connection at least one message from the first inbox that is not already within the second inbox; and subsequently inserting the at least one message from the first inbox into the second inbox.

6. A method as recited in claim 5, wherein following said subsequently inserting, the message list associated with the second inbox matches a least a first set of the messages in the message list associated with the first inbox.

7. A method for synchronizing a first inbox of a first electronic mail application with a second inbox of a second electronic mail application, the first electronic mail application and the second electronic mail application being connected through a public network, said method comprising:

obtaining an action entry from an action list, the action list indicating changes that have occurred at the second inbox since last synchronization;

preparing a synchronization action message based on the action entry;

sending the synchronization action message to the first electronic mail application through the public network so that the first electronic mail application is able to perform the synchronization action of the synchronization action message to render the first inbox more consistent with the second inbox;

receiving an acknowledgement from the first electronic mall application that the synchronization action has been performed; and thereafter removing the action entry from the action list when the acknowledgement has been received.

8. A method as recited in claim 7, wherein the second mail application provides mail services to mobile devices in a wireless manner.

9. A method as recited in claim 8, wherein the mobile devices are mobile telephones with a display screen for viewing the second inbox.

10. A method as recited in claim 9, wherein the public network comprises the Internet.

11. A method as recited in claim 7, wherein the first inbox and the second inbox include messages, and wherein said method further comprises: deleting at least one of the messages from the second inbox that is known to be present in the first inbox.

12. A method as recited in claim 11, wherein said method further comprises:

receiving at the second mail application, subsequent to said deleting, at least one message from the first inbox that is known not to be present in the second inbox; and inserting the at least one message from the first inbox into the second inbox.

13. A method as recited in claim 12, wherein following said deleting and said inserting the messages within the second inbox match at least a first set of the messages in the first inbox.

14. A method as recited in claim 12, wherein the number of messages deleted by said deleting equals the number of messages inserted by said inserting.

15. A method as recited in claim 7, wherein the action entry is one of READ, DELETE, SEND, INSERT, MOVE and MARK.

16. A method as recited in claim 7, wherein the first electronic mail application operates on a first mail server, and the second electronic mail application operates on a second mail server.

17. A method as recited in claim 16, wherein at least one of the first and second applications provides electronic mail services to wireless devices.

18. A method as recited in claim 16, wherein said sending and said receiving communicate between the first and second electronic mail applications over a dedicated connection through the public network.

19. A method as recited in claim 18, wherein the dedicated connection is a secure connection.

20. A method as recited in claim 19, wherein the communications over the dedicated connection use a network protocol chosen from the group consisting of HTTP, HTTPs and FTP.

21. A method as recited in claim 7, wherein the synchronization action message instructs the first electronic mail application to perform the synchronization action of one of READ, DELETE, SEND, INSERT, MOVE and MARK.

* * * * *